United States Patent
Sakakibara

[11] Patent Number: 6,124,698
[45] Date of Patent: Sep. 26, 2000

[54] BATTERY CHARGER

[75] Inventor: Kazuyuki Sakakibara, Anjo, Japan

[73] Assignee: Makita Corporation, Japan

[21] Appl. No.: 09/327,562

[22] Filed: Jun. 8, 1999

[30] Foreign Application Priority Data

| Jun. 9, 1998 | [JP] | Japan | 10-160913 |
| Jun. 9, 1998 | [JP] | Japan | 10-160915 |
| Jun. 9, 1998 | [JP] | Japan | 10-460914 |

[51] Int. Cl.$^7$ .................................................. H01M 10/46
[52] U.S. Cl. ........................... 320/110; 320/150; 320/160
[58] Field of Search .................................. 320/110, 119, 320/125, 132, 137, 150, 153, 160

[56] References Cited

U.S. PATENT DOCUMENTS

| 5,352,968 | 10/1994 | Remi et al. | 320/150 X |
| 5,363,031 | 11/1994 | Miller et al. | 320/160 X |
| 5,691,078 | 11/1997 | Kozaki et al. | 320/DIG. 21 X |
| 5,874,825 | 2/1999 | Brotto | 320/150 |

FOREIGN PATENT DOCUMENTS

| 200693 | 5/1993 | Germany . |
| 05244729 | 9/1993 | Japan . |
| 06121468 | 4/1994 | Japan . |
| 10014125 | 1/1998 | Japan . |

*Primary Examiner*—Edward H. Tso
*Attorney, Agent, or Firm*—Welsh & Katz, Ltd.; Thomas W. Tolpin

[57] ABSTRACT

A battery charger determines the completion of battery charge based on a battery temperature and a temperature rise value. In determination, if the battery temperature and the battery rise temperature belong to a region in the map, which tends to occur at the beginning of a final charging period ('In' in a step S334), a low count value "1" is added to a counter (in a step S336). If they belong to a region which tends to occur at the end of the final charging period ('In' in a step S340), a high count value "3" is added to the counter (in a step S340). If the sum of the count values exceeds a set value, completion of battery charge is determined ('High' in a step S348). That is, if temperature rise is large and the temperature rise remains large even with the charging current value being lowered, then a high count value is added to the counter. If temperature rise is large but the temperature rise does not increase very much with the charging current value being lowered, then a low count value is added to the counter. Thus, the battery can be charged to a target capacity without influences of the battery residual capacity, temperature and the like.

25 Claims, 29 Drawing Sheets

Fig.2
(A)
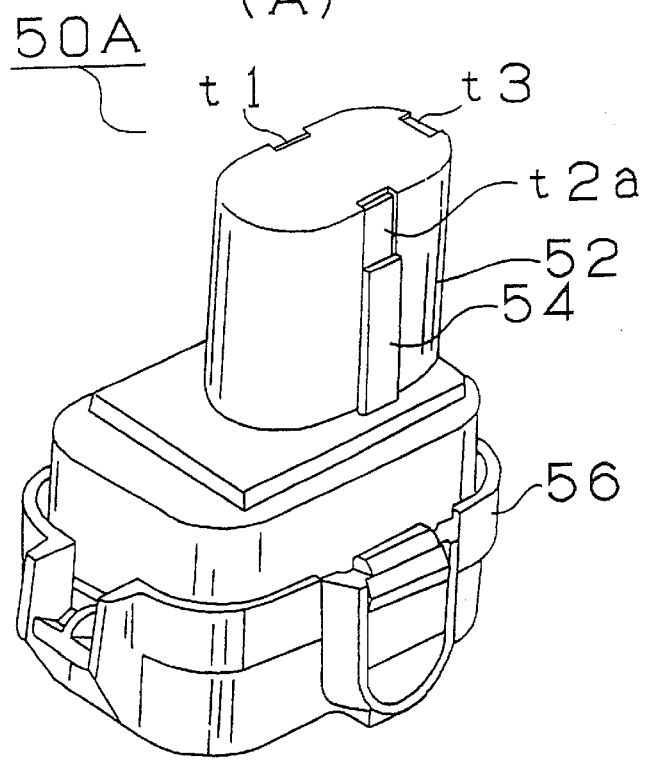
(B)
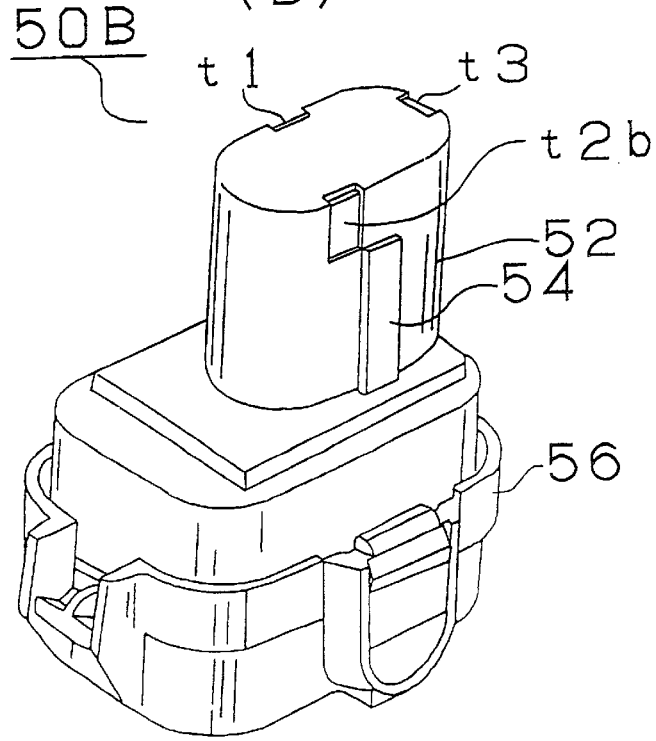

| | low temperature $\to$ $|T|$ $\to$ high temperature | | | | | |
|---|---|---|---|---|---|---|
| small | $I_{11}$ | $I_{12}$ | $I_{13}$ | $I_{14}$ | $I_{15}$ | $I_{16}$ |
| | $I_{21}$ | $I_{22}$ | $I_{23}$ | $I_{24}$ | $I_{25}$ | $I_{26}$ |
| dT/dt | $I_{31}$ | $I_{32}$ | $I_{33}$ | $I_{34}$ | $I_{35}$ | $I_{36}$ |
| | $I_{41}$ | $I_{42}$ | $I_{43}$ | $I_{44}$ | $I_{45}$ | $I_{46}$ |
| large | $I_{51}$ | $I_{52}$ | $I_{53}$ | $I_{54}$ | $I_{55}$ | $I_{56}$ |
| | $I_{61}$ | $I_{62}$ | $I_{63}$ | $I_{64}$ | $I_{65}$ | $I_{66}$ |

(B)

M22

| | low temperature $\to$ $|T|$ $\to$ high temperature | | | | | |
|---|---|---|---|---|---|---|
| small | $I_{11}$ | $I_{12}$ | $I_{13}$ | $I_{14}$ | $I_{15}$ | $I_{16}$ |
| | $I_{21}$ | $I_{22}$ | $I_{23}$ | $I_{24}$ | $I_{25}$ | $I_{26}$ |
| dT/dt | $I_{31}$ | $I_{32}$ | $I_{33}$ | $I_{34}$ | $I_{35}$ | $I_{36}$ |
| | $I_{31}$ | $I_{32}$ | $I_{43}$ | $I_{44}$ | $I_{45}$ | $I_{46}$ |
| large | $I_{41}$ | $I_{42}$ | $I_{53}$ | $I_{54}$ | $I_{55}$ | $I_{56}$ |
| | $I_{51}$ | $I_{52}$ | $I_{63}$ | $I_{64}$ | $I_{65}$ | $I_{66}$ |
| | $I_{61}$ | $I_{62}$ | | | | |

Fig.22

| dT/dt \ |T| | ~T₁ | T₁~T₂ | T₂~T₃ | T₃~T₄ | T₄~T₅ | T₅~ |
|---|---|---|---|---|---|---|
| ~X₁ | I₁₁ | I₁₂ | I₁₃ | I₁₄ | I₁₅ | I₁₆ |
| X₁~X₂ | I₂₁ | I₂₂ | I₂₃ | I₂₄ | I₂₅ | I₂₆ |
| X₂~X₃ | I₃₁ | I₃₂ | I₃₃ | I₃₄ | I₃₅ | I₃₆ |
| X₃~X₄ | I₄₁ | I₄₂ | I₄₃ | I₄₄ | I₄₅ | I₄₆ |
| X₄~X₅ | I₅₁ | I₅₂ | I₅₃ | I₅₄ | I₅₅ | I₅₆ |
| X₆~ | I₆₁ | I₆₂ | I₆₃ | I₆₄ | I₆₅ | I₆₆ |

| dT/dt | |T| | ~T1 | T1~T2 | T2~T3 | T3 |
|---|---|---|---|---|---|
| ~X1 | | I11 T_{OFF11} | I12 T_{OFF12} | I13 T_{OFF13} | I14 T_{OFF14} |
| X1~X2 | | I21 T_{OFF21} | I22 T_{OFF22} | I23 T_{OFF23} | I24 T_{OFF24} |
| X2~X3 | | I31 T_{OFF31} | I32 T_{OFF32} | I33 T_{OFF33} | I34 T_{OFF34} |
| X3~ | | I41 T_{OFF41} | I42 T_{OFF42} | I43 T_{OFF43} | I44 T_{OFF44} |

BATTERY CHARGER

BACKGROUND OF THE INVENTION

1. Field of the Invention

The present invention relates to a battery charger suited for charging a battery, such as a nickel metal hydride battery, which emits high heat while being charged.

2. Description of the Related Art

Presently, a chargeable battery which can be repeatedly used for the power supply of, for example, a power tool is used. A nickel cadmium battery is popular as a battery for the power tool, and a battery charger for quickly charging a battery by applying high current to the battery is used. Specifically, the battery is quickly charged in about 20 minutes and a power tool can be continuously used by changing a battery to a battery which has been charged.

The inventor of the present invention studied improving the performance of a power tool by using a nickel metal hydride battery as a battery therefore. Although the nickel metal hydride battery can increase a capacity compared to a nickel cadmium battery, it generates high heat while being charged. If the temperature of the battery becomes high by the generated heat, the electrodes and separator of the cell within the battery deteriorate and battery life is shortened. Due to this, it is impossible to quickly charge the nickel metal hydride battery with high current as done for the nickel cadmium battery stated above.

Further, the nickel metal hydride battery is more sensitive to overcharge than the nickel cadmium battery and, if overcharged, the battery life is shortened. Due to this, it is necessary to avoid overcharging the battery. To avoid overcharge, in case of equipment which does not change one battery to another, 100% charge can be conducted by: integrating charging current and discharging current, and by charging the battery based on the integral value. In case of charging a plurality of batteries while changing one battery to another for use in a power tool as stated above, however, it is difficult to charge them up to 100% capacity without causing overcharge.

Moreover, according to the conventional technique the battery charger for use in a power tool has enough charging capacity to continuously charge about two batteries with a view to providing a power supply circuit at low cost. Due to this, if three or more batteries are to be continuously charged, charging current is considerably lowered by a protection device. As a result, if continuous charge is conducted, it takes a longer time to charge the third or the following batteries.

Further, the inventor of the present invention contrived a method for detecting the completion of 100% charge from a map in which the absolute temperatures of a battery and temperature rise values are mapped. With this method, however, it sometimes occurs that the completion of 100% charge is determined after 100% charge is over, depending on conditions.

In addition, it is required to more accurately detect that a battery is charged to a desired capacity level by the method using the map.

To accurately charge a plurality of types of batteries by the method using the map, maps for the plural types of batteries are required, respectively, with the result that a large storage memory is required for control purposes.

Even if a method for detecting full charge from the map is used, it is difficult to charge batteries in the same manner. This is because various battery packs are employed for various voltages. Namely, a high voltage battery pack contains a number of battery cells and heat tends to accumulate within the pack. Conversely, a low voltage battery pack contains less battery cells and heat inside tends to diverge.

Also, since the nickel metal hydride battery has different temperature rise characteristics according to the residual battery capacity, it is difficult to charge the nickel hydride battery of varied residual capacities using the above-stated map.

Furthermore, if the quantity of current is controlled by detecting battery temperature, it is difficult to charge the battery using the map since the battery temperature changes in a different manner according to environmental temperature.

Although some conventional battery chargers can switch long-time charge to short-time charge and vice versa, the life of a battery is considerably shortened during short-time charge. In addition, the battery charger according to the conventional technique cannot accurately charge a battery to desired capacity.

If a battery pack consisting of a plurality of battery cells is used a number of times by repeatedly charging and discharging them, the capacities of the respective battery cells vary and the performance of the battery pack deteriorates. To deal with deterioration in performance, auxiliary charge is often conducted after completion of ordinary charge, to fully charge the respective battery cells by carrying charging current of about 0.1 C for one to two hours.

Also, the capacity of a nickel metal hydride battery or nickel cadmium battery which has been 100% charged sharply decreases to about 90% by self discharge which takes place right after battery charge is stopped. Thereafter, the battery capacity gradually decreases by self discharge. To deal with a sharp decrease in capacity right after the completion of charge, trickle charge is sometimes conducted in which current of about 0.02 C is continuously carried after the completion of charge.

In the auxiliary charge and trickle charge stated above, average low current is applied to a battery by carrying pulse current. That is to say, the temperature of the battery rises when charge is completed and the capacity of the battery increases to a maximum. At this time, even if quite low current is continuously carried to the battery, the battery cannot be efficiently charged with the current. Considering this, pulse charge is adopted in which slightly high current is carried in a short time and then intermitted for a while.

In the battery charger according to the conventional technique, however, since pulse current is carried in specified cycles, decrease in battery temperature after the completion of charge is delayed. A state in which the battery temperature is high right after the completion of charge continues, thereby adversely influencing the battery life. Besides, while the battery is kept in a high temperature state, charging efficiency is low. To deal with this disadvantage, the temperature of the battery may be lowered by making the pulse current cycle longer. If the charging current cycle, i.e., pulse cycle is made longer to the extent that the battery can be quickly cooled down, self discharge takes place in the battery while the current is not applied to the battery. Due to this, a variation in battery capacity is large when a user takes out the battery from the battery charger. The purpose of auxiliary charge and trickle charge cannot, thereby, be attained.

SUMMARY OF THE INVENTION

An object of this invention is to provide a battery charger capable of continuously charging a plurality batteries in a short time.

A still further object of this invention is to provide a battery charger which can 100% charge a battery without overcharge and which ensures stopping the battery charging.

A still further object of this invention is to provide a battery charger capable of charging a battery to a target capacity.

A still further object of this invention is to provide a battery charger capable of charging a battery in a short time while temperature rise is being suppressed, irrespective of the type of the battery.

A still further object of this invention is to provide a battery charger capable of 100% charging a battery without overcharge, irrespective of the type of the battery.

A still further object of this invention is to provide a battery charger capable of charging a battery in a short time while temperature rise is being suppressed, irrespective of the type of the battery.

A still further object of this invention is to provide a battery charger capable of charging a battery 100% without overcharge, irrespective of the type of the battery.

A still further object of this invention is to provide a battery charger capable of charging a plurality of types of batteries in a short time while temperature rise is being suppressed.

A still further object of this invention is to provide a battery charger capable of 100% charging a plurality of types of batteries without overcharge.

A still further object of this invention is to provide a battery charger capable of charging a battery in a short time while battery temperature rise is being suppressed, irrespective of the residual battery capacity.

A still further object of this invention is to provide a battery charger capable of 100% charging a battery without overcharge, irrespectively of the residual battery capacity.

A still further object of this invention is to provide a battery charger capable of charging a battery in a short time while temperature rise is being suppressed, irrespective of environmental temperature.

A still further object of this invention is to provide a battery charger capable of 100% charging a battery without overcharge, irrespective of environmental temperature.

A still further object of this invention is to provide a battery charger capable of conducting not only short-time charge, but also long-time charge so as not to shorten the battery life.

A still further object of this invention is to provide a battery charger capable of charging a battery to a selected target capacity.

A still further object of this invention is to provide a battery charger capable of efficiently conducting auxiliary charge or trickle charge.

A battery charger according to the present invention comprising;

a storage device storing at least two types of maps, in which an allowable current value, with which a battery can be charged while a temperature rise of the battery is being suppressed, is mapped based on a battery temperature value and a battery temperature rise value, in accordance with a temperature of the battery charger;

temperature detecting means for detecting a current battery temperature;

temperature rise value outputting means for obtaining the temperature rise value from the temperature detected by said temperature detecting means;

battery charger temperature detecting means for detecting the temperature of said battery charger;

allowable current value retrieving means for retrieving a map corresponding to the battery charger temperature, from the battery charger temperature detected by said battery charger temperature detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

In accordance with the more preferred teaching of the present invention, the map used is set so as not to carry high charging current when the battery charger temperature is high and corresponding to said battery charger temperature.

The battery charger employs a map in which an allowable current value, with which a battery can be charged while battery temperature rise is being suppressed, is mapped based on a battery temperature value and a battery temperature rise value, in accordance with the temperature of the battery charger. In this case, the map corresponding to the temperature of the battery charger is retrieved based on the battery temperature and the temperature rise value. An allowable current value, with which the battery can be charged while battery temperature rise is being suppressed, is obtained and the battery is charged with the allowable current value. That is, if the nickel metal hydride batteries are continuously charged, the temperature of the battery charger increases, which may cause a failure in the battery charger. By decreasing the charging current to the extent that generated heat does not cause a failure in the battery charger based on the map, it is possible to charge a plurality of batteries in a short time.

A battery charger according to the present invention comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

first charge completion determining means for determining completion of battery charge based on whether frequency is high, whereby the temperature detected by said temperature detecting means and the temperature rise value outputted from said temperature rise value outputting means belong to a region indicating a final charging period in the map of said storage device;

second charge completion determining means for determining completion of battery charge if the temperature rise value outputted from said temperature rise value outputting means exceeds a preset temperature rise value; and charge completing means for completing the battery charge, based on determinations as the completion of the battery charge by said first charge completion determining means, and said second charge completion determining means.

In the battery, the first charge completion determining means determines the completion of battery charge based on whether or not a temperature rise value is relatively large, and the frequency with which a relatively low allowable current value is outputted from the map, is high, i.e., based on whether or not temperature rise is large and the temperature rise remains large even if the charging current value is lowered. Due to this, it is possible to charge a battery 100% without overcharge, irrespective of the residual battery capacity, temperature and the like.

On the other hand, if a battery which life expires is to be charged, temperature rise is quite large. Due to this, if the temperature rise rate is high, the second charge completion determining means determines that battery charge is completed, whereby the charge of the battery can be instantly stopped without continuing long-time charge.

A battery charger according to the present invention comprising;

a storage device storing a map in which an allowable current value, with which a battery can be charged while a temperature rise of the battery is being suppressed, is mapped based on a battery temperature value and a battery temperature rise value and in which the allowable current value is set low, if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means, and the temperature rise value outputted from said temperature rise value outputting means, and for obtaining said allowable current value;

charging means for charging the battery with the allowable current value retrieved by said allowable current value retrieving means;

first charge completion determining means for determining completion of battery charge based on whether frequency, with which the temperature detected by said temperature detecting means and the temperature rise value outputted from said temperature rise value outputting means belong to a region indicating a final charging period in the map of said storage device, is high;

second charge completion determining means for determining completion of battery charge if the temperature value outputted from said temperature detecting means exceeds a preset temperature value; and charge completing means for completing the battery charge based on determinations by said first charge completion determining means and said second charge completion determining means.

In the battery charger, the first charge completion determining means determines the completion of battery charge based on whether or not a temperature rise value is relatively large and whether or not the frequency with which a relatively low allowable current is outputted from the map is high, i.e., based on whether temperature rise is large and the temperature rise remains large even if the charging current value is lowered Due to this, it is possible to charge the battery 100% without overcharge, irrespective of the residual battery capacity, temperature and the like.

On the other hand, the second charge completion determining means determines the charge of a battery is completed whereby temperature increases abnormally. By doing so, it is possible to stop battery charge instantly without continuing charge if the battery becomes abnormal or the battery is in a state in which high temperature greatly deteriorates the battery life.

A battery charger according to the present invention comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

voltage detecting means for detecting battery voltage;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

first charge completion determining means for determining completion of battery charge based on whether frequency is high; whereby the temperature detected by said temperature detecting means and the temperature rise value outputted from said temperature rise value outputting means belong to a region indicating a final charging period in the map of said storage device;

second charge completion determining means for determining completion of battery charge if a decrease value of the battery voltage outputted from said voltage detecting means exceeds a preset decrease value; and charge completing means for completing the battery charge based on determinations by said first charge completion determining means and by said second charge completion determining means.

In the battery charger, the first charge completion determining means determines the completion of battery charge based on whether or not a temperature rise value is relatively high and whether or not the frequency with which a relatively low allowable current value is outputted from the map is high, i.e., based on whether or not temperature rise is large and the temperature rise remains high even if the charging current value is lowered. Due to this, it is possible to 100% charge the battery without overcharge, irrespective of the residual battery capacity, temperature and the like.

On the other hand, if environmental temperature is low, a battery is cooled and the detection of the battery temperature rise value may become difficult. In addition, a battery which has been stocked for a long time may exhibit a temperature change pattern different from an ordinary battery. Owing to this, if it is detected that a voltage drop is a predetermined degree or more, the second charge completion determining means determines battery charge is completed, whereby it is possible to stop charging the battery without continuing long-time charge.

A battery charger according to the present invention comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

first charge completion determining means for determining completion of battery charge based on whether frequency is high; whereby the temperature detected by said temperature detecting means, and the temperature rise value outputted from said temperature rise value outputting means, belong to a region indicating a final charging period in the map of said storage device;

second charge completion determining means for integrating charging current quantity for said battery, and for determining completion of battery charge if an integral value exceeds a preset integral value; and charge completing means for completing the battery charge based on determinations by said first charge completion determining means, and by said second charge completion determining means.

In the battery charger, the first charge completion determining means determines the completion of battery charge based on whether or not a temperature rise value is relatively high and whether or not the frequency with which a relatively low allowable current value is outputted from the map, i.e., based on whether or not temperature rise is large and the temperature rise remains large even if the charging current value is lowered. Due to this, it is possible to ensure charging the battery 100% without charging continuously it for a long time.

On the other hand, the first charge completion determining means sometimes cannot detect the completion of battery charge for various reasons. To deal with this, the quantity of the charging current is integrated. If the integral value exceeds a predetermined value, the second charge completion determining means determines that the battery charge is completed, thereby ensuring that battery charge is stopped without continuing it for a long time.

A battery charger according to the present invention comprising;

a storage device storing a map in which an allowable current value, with which a battery can be charged while a temperature rise of the battery is being suppressed, is mapped based on a battery temperature value, and a battery temperature rise value and in which the allowable current value is set low if the temperature value is high, and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

charge completion determining means for determining completion of battery charge based on whether the temperature detected by said temperature detecting means, and the temperature rise value outputted from said temperature rise value outputting means belong to a region, which tends to occur in a final charging period in the map of said storage device, for adding a low count value to a count if the temperature detected by said temperature detecting means, and the temperature rise value outputted from said temperature rise value outputting means belong to a region, which tends to occur at a start of the final charging period in the map, for adding a high count value to the count if the temperature detected by said temperature detecting means, and the temperature rise value outputted from said temperature rise value outputting means belong to a region, which tends to occur at an end of the final charging period in the map, and for determining the completion of the battery charge if a sum of count values exceeds a set value; and charge completing means for completing the battery charge based on determination as the completion of the battery charge, by said first charge completion determining means and by said second charge completion determining means.

In the battery charger, the completion of battery charge is determined based on whether or not the battery temperature and the battery rise value belong to regions in the map which tend to occur in the final charging period. At this time, if they belong to the regions in the map which tend to occur at the start of the final charging period, a low count value is added to the counter. If they belong to the regions which tend to occur at the end of the charging final period, a high count value is added to the counter. If the sum of the counter values exceeds a predetermined value, it is determined that battery charge is completed. That is, if temperature rise is large and the temperature rise remains large even if the charging current value is lowered, a high count value is added to the counter. If temperature rise is large but the temperature rise does not increase very much by lowering the charging current value, then a low count value is added to the counter. Due to this, it is possible to 100% charge the battery without overcharge, irrespective of the residual battery capacity, temperature and the like. In particular, depending on the setting of the map, it is possible to freely detect the capacity value which is set at 85%±5% or 95%±5% as well as 100%.

A battery charger capable of charging a battery of a first type and a battery of a second type according to the present invention comprising:

a storage device for storing a map in which an allowable current value, with which the battery of the first type can be charged while a temperature rise of the battery of the first type is being suppressed, is mapped based on a battery temperature and a battery temperature rise value;

temperature detecting means for detecting a current battery temperature;

temperature rise value outputting means for obtaining the temperature rise value from the temperature detected by said temperature detecting means;

battery type detecting means for detecting whether a battery is the first type or the second type;

allowable current value retrieving means for retrieving the map of said storage device from the temperature detected by said temperature detecting means, and the temperature rise value outputted from said temperature rise value outputting means, the allowable value retrieving means, retrieving said map and obtaining and outputting the allowable current value if the battery of first type is detected by said battery type detecting means, the allowable value retrieving means correcting at least one of the temperature detected by said temperature detecting means, and the temperature rise value outputted from said temperature rise value outputting means, retrieving said map, obtaining the allowable current value and correcting and outputting the obtained allowable current value; and charging means for charging the battery with the allowable current value outputted by said allowable current retrieving means.

The battery charger employs a map in which an allowable current value with which a battery can be charged while battery temperature rise is being suppressed, is mapped based on a battery temperature value and a battery temperature rise value. In this case, a battery of the first type is charged by retrieving the map for the first battery type and obtaining an allowable current value. A battery of the second type is charged by correcting at least one of the battery temperature and the battery temperature rise value, retrieving the map for the first battery type, obtaining the allowable current value and correcting the obtained allowable current value. Due to this, it is possible to charge both the batteries of first and second types in a short time without causing deterioration due to temperature rise using a single map.

A battery charger capable of charging a battery of a first type and a battery of a second type according to the present invention comprising:

a storage device for storing a map in which an allowable current value, with which the battery of the first type can be charged while a temperature rise of the battery of the first type is being suppressed, is mapped based on a battery temperature and a battery temperature rise value;

temperature detecting means for detecting a current battery temperature;

temperature rise value outputting means for obtaining the temperature rise value from the temperature detected by said temperature detecting means;

battery type detecting means for detecting whether a battery is the first type or the second type;

allowable current value retrieving means for retrieving the map of said storage device from the temperature detected by said temperature detecting means and the temperature rise value outputted from said temperature rise value outputting means, the allowable value retrieving means retrieving said map and obtaining and outputting the allowable current value, if the battery of the first type is detected by said battery type detecting means, the allowable value retrieving means correcting at least one of the temperature detected by said temperature detecting means, and the temperature rise value outputted from said temperature rise value outputting means, retrieving said map, obtaining the allowable current value and correcting and outputting the obtained allowable current value;

charging means for charging the battery with the allowable current value obtained by said allowable current retrieving means;

charge completion determining means for determining completion of battery charge based on whether frequency, with which the temperature detected by said temperature detecting means, and the temperature rise value outputted from said temperature rise value outputting means belong to a region indicating a final charging period in the map of said storage means, is high, the charge completion determining means directly retrieving said map if the battery of the first type is detected by said battery type detecting means, the charge completion determining means retrieving said map after correcting at least one of the temperature detected by said temperature detecting means, and the temperature rise value outputted from said temperature rise value outputting means; and charge completing means for completing the battery charge based on determination as the completion of the battery charge by said charge completion determining means.

The battery charger employs a map in which an allowable current value with which a battery can be charged while battery temperature rise is being suppressed, is mapped based on a battery temperature value and a battery temperature rise value. In this case, a battery of the first type is charged by retrieving the map for the first battery type and obtaining an allowable current value. A battery of the second type is charged by correcting at least one of the battery temperature and the battery temperature rise value, retrieving the map for the first battery type, obtaining the allowable current value and correcting the obtained allowable current value. Due to this, it is possible to charge both the batteries of first and second types in a short time without causing deterioration due to temperature rise using a single map.

In particular, the determination of battery charge is determined based on whether or not a temperature rise value is relatively large and whether or not the frequency with which a relatively low current value is outputted from the map is high, i.e., based on whether or not temperature rise is large and the temperature rise remains large even if the charging current value is lowered. As for the battery of the first type, the completion of battery charge is determined by directly retrieving the map for the first battery type. As for the battery of the second type, the completion of battery charge is determined by correcting at least one of the battery temperature and the battery temperature rise value and retrieving the map for the first battery type. Due to this, it is possible to 100% charge the batteries of the first and second types without overcharge using a signal map, irrespective of the residual battery capacity, temperature and the like.

In accordance with the more preferred teaching of the present invention, the battery of the first type is a nickel metal hydride battery and the battery of the second type is a nickel cadmium battery; and said allowable current value retrieving means obtains the allowable current value by correcting the temperature rise value to a positive side and retrieving said map, corrects the obtained allowable current value to a positive side and outputs the corrected allowable current value.

In the battery charger, a map is set for a nickel metal hydride battery which temperature tends to rise during charge and which tends to deteriorate due to temperature rise. Owing to this, optimum charging current control can be conducted to the nickel metal hydride battery.

In accordance with the more preferred teaching of the present invention, the battery of the first type is a nickel cadmium battery and the battery of the second type is a nickel metal hydride battery; and said allowable current value retrieving means obtains the allowable current value by correcting the temperature rise value to a negative side and retrieving said map, corrects the obtained allowable current value to a negative side and outputs the corrected allowable current value.

In the battery charger, a map is set for a nickel cadmium battery which temperature tends to rise less during charge. Owing to this, optimum current charging control can be conducted to the nickel cadmium battery.

A battery charger capable of charging batteries of different types, characterized by comprising;

a storage device storing a map, in which an allowable current value, with which a battery can be charged while a temperature rise of the battery is being suppressed, is mapped based on a battery temperature value and a battery temperature rise value, for every battery type;

temperature detecting means for detecting a current battery temperature;

temperature rise value outputting means for obtaining the temperature rise value from the temperature detected by said temperature detecting means;

battery type detecting means for detecting a battery type;

allowable current value retrieving means for retrieving the map for the battery of the detected battery type of said storage device, from the battery type detected by said battery type detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

The battery charger employs a map in which an allowable current value with which a battery can be charged while battery temperature rise is being suppressed is mapped according to the type of the battery, based on battery temperature and a battery temperature rise value. That is, the map for the corresponding battery type is retrieved based on the battery temperature and the temperature rise value, an allowable current value, with which the battery can be charged while temperature rise is being suppressed, is obtained and the battery is charged with the allowable current value. Due to this, it is possible to charge the nickel hydride battery, which temperature tends to rise during charge, in a short time without causing deterioration due to temperature rise. In addition, just before the completion of battery charge, the temperature rise of the nickel metal hydride battery is large and a relatively low current value is used for charge, whereby it is possible to suppress "overshoot" after the completion of battery charge. Besides, the nickel cadmium battery, which temperature rise is relatively small, can be charged in a short time by carrying high current.

A battery charger capable of charging batteries of different types according to the present invention comprising;

a storage device storing a map, in which an allowable current value, with which a battery can be charged while a temperature rise of the battery is being suppressed is mapped based on a battery temperature value, and a battery temperature rise value, and in which the allowable current value is set low if the temperature value is high and the allowable current value is set low if the temperature rise value is high for every battery type;

temperature detecting means for detecting a current battery temperature;

temperature rise value outputting means for obtaining the temperature rise value from the temperature detected by said temperature detecting means;

battery type detecting means for detecting a battery type;

allowable current value retrieving means for retrieving the map for the battery of the detected battery type of said storage device, from the battery type detected by said battery type detecting means, the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency is high; whereby the temperature detected by said temperature detecting means, and the temperature rise value outputted from said temperature rise value outputting means belong to a region indicating a final charging period in the map for the battery of the detected battery type; and charge completing means for completing the battery charge based on determination as the completion of the battery charge by said charge completion determining means.

The battery charger employs a map in which an allowable current value, with which a battery can be charged while battery temperature rise is being suppressed, according to the type of the battery is mapped based on a battery temperature value and a battery temperature rise value. That is, a map according to the battery type is retrieved based on the temperature value and the temperature rise value, an allowable current value with which the battery can be charged while temperature rise is being suppressed is obtained, and the battery is charged with the allowable current value. Due to this, it is possible to charge the nickel metal hydride battery, which temperature tends to rise during charge, in a short time without causing deterioration due to temperature rise. Additionally, just before the completion of battery charge, the temperature rise of the nickel metal hydride battery is large and the battery is charged with a relatively low current value, whereby it is possible to suppress "overshoot" after the completion of battery charge. Besides, it is possible to charge the nickel cadmium battery, which temperature rise is relatively small, in a short time, by carrying high current.

In particular, the completion of battery charge is determined based on whether or not a temperature rise value is relatively large and whether or not the frequency with which a relative low allowable current value is outputted from the map is high, i.e., based on whether or not temperature rise is large and the temperature rise remains large even if the charging current value is lowered, using a map corresponding to the battery type. Due to this, it is possible to charge the battery 100% without overcharge, irrespective of the battery type.

A battery charger capable of charging batteries of different voltages according to the present invention comprising;

a storage device storing a map, in which an allowable current value, with which a battery can be charged while a temperature rise of the battery is being suppressed, is mapped based on a battery temperature value and a battery temperature rise value;

temperature detecting means for detecting a current battery temperature;

temperature rise value outputting means for obtaining the temperature rise value from the temperature detected by said temperature detecting means;

battery voltage detecting means for detecting a battery voltage;

allowable current value retrieving means for retrieving the map for the detected battery voltage, from the battery voltage detected, by said battery voltage detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

The battery charger employs a map in which an allowable current value, with which a battery can be charged while battery temperature rise is being suppressed, is mapped corresponding to voltage, based on a battery temperature value and a battery temperature rise value according to the voltage of the battery. That is, the map for the corresponding battery voltage is retrieved based on the battery temperature and the battery temperature rise value, an allowable current value, with which the battery can be charged while battery temperature rise is being suppressed, is obtained and the battery is charged with the allowable current value. In other words, as for the nickel metal hydride battery which temperature tends to rise during charge, the battery pack which contains many battery cells tends to accumulate heat inside. Conversely, the battery pack which contains less battery cells tends to diverge internal heat. Thus, it is difficult to charge them in the same manner. With the configuration of the invention, however, it is possible to charge both of them in a short time without causing deterioration due to temperature rise.

A battery charger capable of charging batteries of different voltages according to the present invention comprising;

a storage device storing a map, in which an allowable current value, with which a battery can be charged while a temperature rise of the battery is being suppressed, is mapped based on a battery temperature value and a battery temperature rise value, for every battery voltage;

temperature detecting means for detecting a current battery temperature;

temperature rise value outputting means for obtaining the temperature rise value from the temperature detected by said temperature detecting means;

battery voltage detecting means for detecting a battery voltage;

allowable current value retrieving means for retrieving the map for the detected battery voltage, from the battery voltage detected by said battery voltage detecting means, the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency is high; whereby the temperature detected by said temperature detecting means and the temperature rise value outputted from said temperature rise value outputting means belong to a region indicating a final charging period in the map for the battery voltage, and charge completing means for completing the battery charge based on determination as the completion of the battery charge by said charge completion determining means.

The battery charger employs a map in which an allowable current value with which a battery can be charged while battery temperature rise is being suppressed, is mapped corresponding to voltage, based on a battery temperature value and a battery temperature rise value. That is, the map corresponding to the type of battery is retrieved based on the battery temperature and the battery temperature rise value, an allowable current value, with which the battery can be charged while battery temperature rise is being suppressed, is obtained, and the battery is charged with the allowable current value. In other words, as for the nickel metal hydride battery which temperature tends to rise during charge, the battery pack which contains many battery cells tends to accumulate heat inside. Conversely, the battery pack which contains less battery cells tends to diverge internal heat. Thus, it is difficult to charge them in the same manner. With the present configuration, however, it is possible to charge both of them in a short time without causing deterioration due to temperature rise.

In particular, the completion of battery charge is determined based on whether or not a temperature rise value is relatively large and whether or not the frequency with which a relatively low allowable current value is outputted from the map corresponding to the battery voltage is high, i.e., based on whether or not temperature rise is large and the temperature rise remains large even if charging current value is lowered, using the map corresponding to the battery voltage. Due to this, it is possible to charge the battery 100% without overcharge, irrespective of battery voltage.

A battery charger for charging a current, capable of outputting a residual battery capacity according to the present invention by comprising;

a storage device storing a map, in which an allowable current value, with which a battery can be charged while a temperature rise of the battery is being suppressed, is mapped based on a battery temperature value and a battery temperature rise value, for every residual battery capacity;

temperature detecting means for detecting a current battery temperature;

temperature rise value outputting means for obtaining the temperature rise value from the temperature detected by said temperature detecting means;

battery capacity receiving means for receiving the residual battery capacity;

allowable current value retrieving means for retrieving the map for the received residual battery capacity of said storage device, from the battery residual capacity received by said battery capacity receiving means, the temperature detected by said temperature detecting means and the temperature rise value outputted from said temperature rise value outputting means, and for obtaining said allowable current value; and charging means for charging the battery with the allowable current value retrieved by said allowable current value retrieving means.

The battery charger employs a map in which an allowable current value with which a battery can be charged while battery temperature rise is being suppressed, which is mapped based on the battery temperature value and the battery temperature rise value according to the residual battery capacity. That is, the map corresponding to the residual capacity of a battery is retrieved based on the battery temperature and the temperature rise value, an allowable current value, with which the battery can be charged while battery temperature rise is being suppressed, is obtained and the battery is charged with the allowable current value. Due to this, it is possible to charge in a short time the nickel metal hydride battery which temperature tends to rise during charge, without causing deterioration due to temperature rise in accordance with the residual battery capacity.

A battery charger for charging a battery, capable of outputting a residual battery capacity according to the present invention comprising;

a storage device storing a map, in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high, for every residual battery capacity;

temperature detecting means for detecting a current battery temperature;

temperature rise value outputting means for obtaining the temperature rise value from the temperature detected by said temperature detecting means;

residual battery capacity receiving means for receiving the residual battery capacity;

allowable current value retrieving means for retrieving the map for the residual battery capacity detected battery voltage, from the residual battery capacity received by said battery capacity receiving means, the temperature detected by said temperature detecting means, and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency is high; with which the temperature detected by said temperature detecting means, and the temperature rise value outputted from said temperature rise value outputting means, belong to a region indicating a final charging period in the map for the residual battery capacity, and charge completing means for completing the battery charge based on determination as the completion of the battery charge by said charge completion determining means.

The battery charger employs a map in which an allowable current value with which a battery can be charged while battery temperature rise is being suppressed, is mapped based on the battery temperature value and the battery temperature rise value according to the residual battery capacity. That is, the map corresponding to the residual capacity of a battery is retrieved based on a battery temperature value and a temperature rise value, an allowable current value, with which the battery can be charged while battery temperature rise is being suppressed, is obtained and the battery is charged with the allowable current value. Due to this, it is possible to charge in a short time the nickel metal hydride battery, which temperature tends to rise during charge without causing deterioration due to temperature rise in accordance with the residual battery capacity.

In particular, the completion of battery charge is determined based on whether or not a temperature rise value is relatively large and whether or not the frequency with which a relatively low allowable current value is high; which is outputted from the map corresponding to the residual battery capacity, i.e., based on whether or not temperature rise is large and the temperature rise remains large even if the charging current value is lowered. Due to this, it is possible to charge the battery 100% without overcharge according to the residual battery capacity. Besides, the resolution of the map for the high residual battery capacity substantially increases, so that detection accuracy enhances for 100% charge. So that detection accuracy enhances for 100% charge.

A battery charger according to the present invention comprising;

a storage device storing at least two types of maps, in which an allowable current value, with which a battery can be charged while a temperature rise of the battery is being suppressed, is mapped based on a battery temperature value and a battery temperature rise value, in accordance with an environmental temperature;

temperature detecting means for detecting a current battery temperature;

temperature rise value outputting means for obtaining the temperature rise value from the temperature detected by said temperature detecting means;

environmental temperature detecting means for detecting the environmental temperature;

allowable current value retrieving means for retrieving a map for the environmental temperature, from the environmental temperature detected by said environmental temperature detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

The battery charger employs a map in which an allowable current value with which a battery can be charged while battery temperature rise is being suppressed, is mapped based on a battery temperature value and a battery temperature rise value according to environmental temperature. That is, a map is retrieved based on the battery temperature and the temperature rise value, an allowable current value, with which the battery can be charged while battery temperature rise is being suppressed, is obtained and the battery is charged with the allowable current value. Although the temperature of the nickel metal hydride battery tends to rise during charge, and it rises in a different manner according to the environmental temperature, it is possible to charge in a short time the nickel metal hydride battery without causing deterioration due to temperature rise, irrespective of the environmental temperature.

A battery charger according to the present invention comprising;

a storage device storing at least two types of maps, in which an allowable current value, with which a battery can be charged while a temperature rise of the battery is being suppressed, is mapped in accordance with an environmental temperature based on a battery temperature value, and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

environmental temperature detecting means for detecting the environmental temperature;

allowable current value retrieving means for retrieving the map for the environmental temperature, from the environmental temperature detected by said environmental temperature detecting means, the temperature detected by said temperature detecting means, and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means, and the temperature rise value is high; outputted from said temperature rise value outputting means belong to a region indicating a final charging period in the map for the environmental temperature of said storage device, and charge completing means for completing the battery charge based on determination as the completion of the battery charge by said charge completion determining means.

The battery charger employs a map which is mapped based on a battery temperature value and a battery temperature rise value according to environmental temperature which is an allowable current value with which a battery can be charged while battery temperature rise is being suppressed. That is, a map is retrieved based on the battery temperature and the temperature rise value, an allowable current value, with which the battery can be charged while battery temperature rise is being suppressed, is obtained and the battery is charged with the allowable current value. Although the temperature of the nickel metal hydride battery tends to rise during charge and it rises in a different manner according to the environmental temperature, it is possible to charge in a short time the nickel metal hydride battery without causing deterioration due to temperature rise, irrespective of the environmental temperature.

In particular, the completion of battery charge is determined based on whether or not a temperature rise value is relatively large and whether or not the frequency with which a relatively low allowable current value is outputted from the map corresponding to the environmental temperature is high, i.e., based on whether or not temperature rise is large and the temperature rise remains large even if the charging current value is lowered. Due to this, it is possible to charge the battery 100% without overcharge, irrespective of the environmental temperature.

A battery charger according to the present invention comprising;

a storage device storing maps in which the allowable current value, with which a battery can be charged while a temperature rise of the battery is being suppressed, is mapped based on a battery temperature value and a battery temperature rise value, said maps including a first map for setting a relatively high allowable current value and a second map for setting a relatively low allowable current value;

temperature detecting means for detecting a current battery temperature;

temperature rise value outputting means for obtaining the temperature rise value from the temperature detected by said temperature detecting means;

map selecting means for selecting one of the first map and the second map of said storage device;

allowable current value retrieving means for retrieving the map selected by said map selecting means, from the temperature detected by said temperature detecting means and the temperature rise value outputted from said temperature rise value outputting means, and for obtaining said allowable current value; and charging means for charging the battery with the allowable current value retrieved by said allowable current value retrieving means.

The battery charger employs a plurality of maps in which an allowable current value with which a battery can be charged while battery temperature rise is being suppressed, is mapped based on a battery temperature value and a battery temperature rise value. That is, a selected map is retrieved based on the battery temperature and the temperature rise value, an allowable current value, with which the battery can be charged while the battery temperature rise is being suppressed, is obtained and the battery is charged with the allowable current value. In this case, if the first map in which the allowable current value is set high is selected, high charging current is carried, thereby preventing the nickel metal hydride battery which temperature tends to rise from deteriorating due to temperature rise during charge. In other words, it is possible to charge in a short time the nickel metal hydride battery to the extent that the battery life is not shortened. On the other hand, if the second map in which the allowable current value is set low is selected, low charging current is carried. By doing so, the nickel metal hydride battery which life tends to deteriorate due to overcharge over a long time, thereby making it possible to lengthen the battery life.

A battery charger according to the present invention comprising;

a storage device storing maps in which the allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high, said maps including a first map in which a target current capacity is relatively high and a second map in which the target current capacity is relatively low;

temperature detecting means for detecting a current battery temperature;

temperature rise value outputting means for obtaining the temperature rise value from the temperature detected by said temperature detecting means;

map selecting means for selecting one of the first map and the second map of said storage device;

allowable current value retrieving means for retrieving the map selected by said map selecting means, from the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means and the temperature rise value is high outputted from said temperature rise value outputting means, belong to a region indicating a final charging period in the map selected by said map selecting means; and charge completing means for completing the battery charge based on determination as the completion of the battery charge by said charge completion determining means.

The battery charger employs a plurality of maps in which an allowable current value with which a battery can be charged while temperature rise is being suppressed, is mapped based on a battery temperature value and a battery temperature rise value. That is, a selected map is retrieved based on the battery temperature and the temperature rise value, an allowable current value, with which the battery can be charged while the battery temperature rise is being suppressed, is obtained and the battery is charged with the allowable current value. In this case, if the first map in which a target charging capacity is set high is selected, the nickel metal hydride battery which temperature tends to rise during charge to the high target charging capacity in a short time to the extent that the battery does not deteriorate due to temperature rise. On the other hand, if the second map in which the target charging capacity is set low is selected, battery charge is stopped before full charge, whereby the life of the nickel metal hydride battery which life tends to deteriorate due to overcharge can be lengthened.

In particular, the completion of battery charge is determined based on whether or not a temperature rise value is relatively high and whether or not the frequency with which a relatively low allowable current value is high which is outputted from the map, i.e., based on whether or not temperature rise is large and the temperature rise remains large even if the charging current value is lowered. Due to this, it is possible to charge the battery to a target charging capacity.

A battery charger for conducting one of auxiliary charge and trickle charge after completing battery charge according to the present invention comprising:

a storage device storing a map in which an allowable current value, with which a battery can be charged in a pulse-like manner while a battery temperature is being suppressed, and a pulse interval are mapped based on a battery temperature and a battery temperature decrease value;

temperature detecting means for detecting a current battery temperature;

temperature decrease value outputting means for obtaining the temperature decrease value from the temperature detected by said temperature detecting means;

allowable current value retrieving means for retrieving the map of said storage device from the temperature detected by said temperature detecting means, and the temperature decrease value outputted from said temperature decrease value outputting means, and for obtaining said allowable current value and said pulse interval; and charging means for charging the battery with the allowable current value the pulse interval detected, by said allowable current value retrieving means.

In accordance with the more preferred teaching of the present invention, the map of said storage device is set such that if the battery temperature is high and the temperature decrease is small, the allowable current value is high and the pulse interval is long, and that if the battery temperature is low and the temperature decrease is large, the allowable current value is low and the pulse interval is short.

The battery charger according to the present invention controls a pulse current value and a pulse cycle so as to be able to conduct auxiliary charge while decreasing the battery temperature, using a map mapped based on a battery temperature value and a battery temperature decrease value. That is, if battery temperature is high and temperature decrease is small, then the allowable current value is increased, the pulse cycle is made longer and the battery temperature is quickly decreased, thereby allowing efficient battery charge. On the other hand, if battery temperature is low or temperature decrease is large, the pulse cycle is made shorter to thereby maintain a 100% charging state constantly.

BRIEF DESCRIPTION OF THE DRAWING

FIGS. 2A and 2B are perspective views of a battery pack in the first embodiment according to the present invention;

FIGS. 12A and 12B are explanatory views indicating the contents of the maps shown in FIG. 11;

FIG. 22 is an explanatory map indicating the contents of maps retained in a charging circuit in the fifth embodiment;

FIG. 25 is an explanatory map indicating the content of a map retained in a charging circuit in the sixth embodiment according to the present invention;

DESCRIPTION OF THE PREFERRED EMBODIMENTS

Battery chargers in the embodiments of the present invention will be described with reference to the accompanying drawings.

Figure 1:
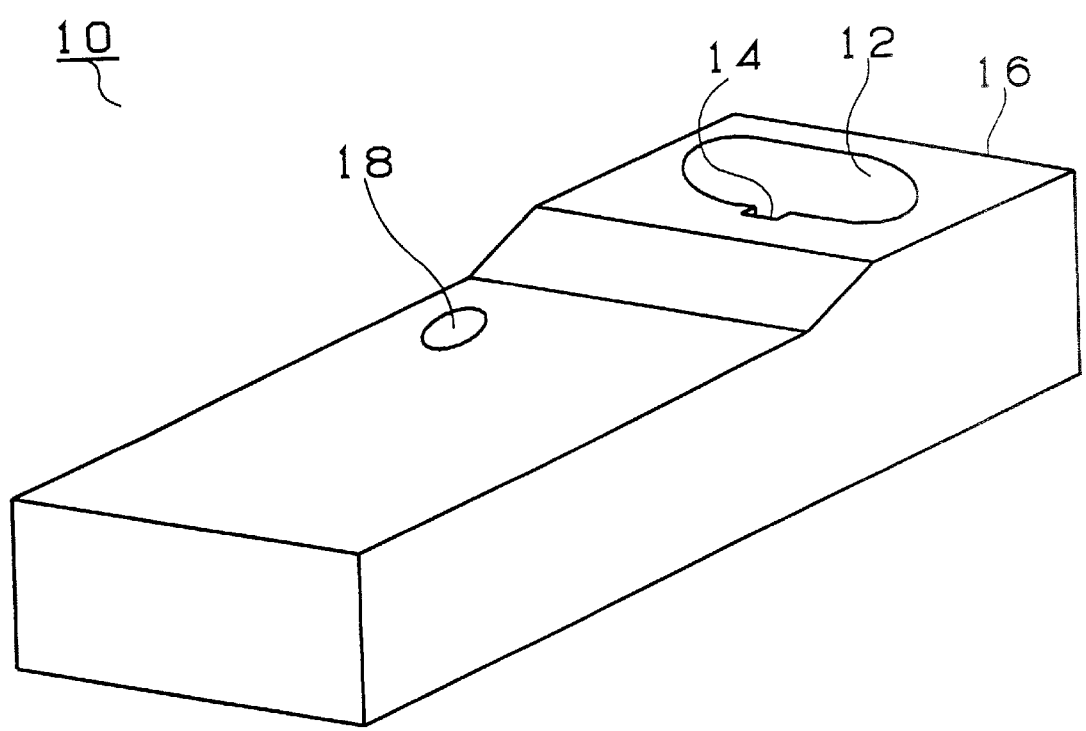
FIG. 1 is a perspective view of a battery charger in the first embodiment according to the present invention.
Figure 3:
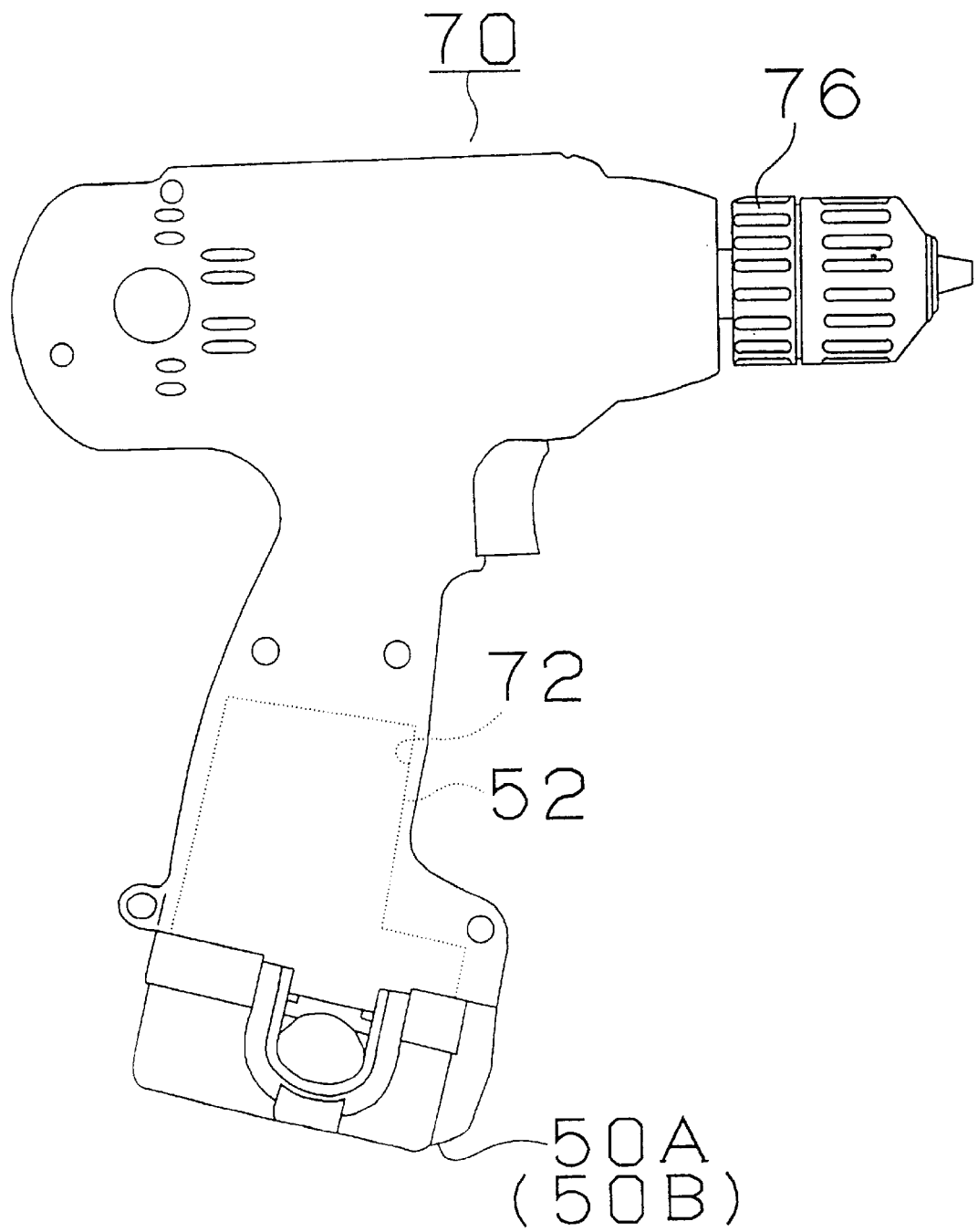
FIG. 3 is a plan view of a battery drill using the battery pack shown in FIGS. 2A and 2B.

FIG. 1 shows a battery charger 10 in the first embodiment, FIGS. 2A and 2B show a battery pack 50A (for a nickel metal hydride battery) and a battery pack 50B (for a nickel cadmium battery) charged by the battery charger 10, respectively, and FIG. 3 shows a battery drill 70 driven by the battery packs 50A or 50B.

As shown in FIG. 2A, the battery pack 50A containing a nickel metal hydride battery consists of a generally cylindrical fitted part 52 and a generally prismatic base 56. A key-shaped key part 54 is formed on the side of the fitted part 52 and the first input terminal t1 connected to the positive electrode of the battery, the second input terminal t2a connected to the negative electrode thereof, and the third terminal t3 connected to a temperature detecting sensor consisting of a thermistor, are arranged on the upper portion of the fitted part 52. As shown in FIG. 2B, the battery pack 50B of the nickel cadmium battery has the same constitution as the battery pack 50A of the nickel metal hydride battery shown in FIG. 2A except that the position of the second input terminal t2b in FIG. 2B is shifted from that of the second input terminal t2a in FIG. 2A. The battery charger 10 can detect whether or not the installed battery pack is for a nickel metal hydride battery or a nickel cadmium battery from the difference in the position between the second input terminals t2a and t2b. In addition, the battery packs 50A and 50B are adapted to different voltages, i.e., 14.4 V, 12V and 9.6V, based on the difference in the number of battery cells contained therein.

As shown in FIG. 1, the battery charger 10 charging the battery packs 50A or 50B is provided with a fitting hole 12 into which the fitted part 52 of the battery pack 50A or 50B is fitted. A key way 14 for introducing the key part 54 of the fitted part 52 is formed on the sidewall of the fitting hole 12. The fitting hole 12 is resin molded integrally with a housing 16 for forming the battery charger 10. In this embodiment, the key part 54 is provided at the fitted part 52 of the battery pack 50A or 50B and the key way 14 is provided at the fitting hole 12 of the battery charger 10, thereby preventing the battery pack 50A or 50B from being installed in a wrong direction. The first to third output terminals, which are not shown, are provided at the bottom of the fitting hole 12 to contact with the first to third terminals t1, t2a or t2b and t3 of the battery pack 50A or 50B, respectively. An LED lamp 18 is provided on the upper portion of the battery charger 10 to indicate that a battery is being charged.

As shown in FIG. 3, the battery drill 70 is provided with a fitting hole 72 into which the fitted part 52 of the battery pack 50A or 50B is fitted, and is designed to rotate a chuck 76 by a motor, which is not shown, by the supply power from the first input terminal t1 and the second input terminal t2 of the battery pack 50A or 50B. When the battery drill 70 is used, a plurality of battery cells in the battery pack 50A or 50B which are completed with charge are sequentially used so that the battery drill 70 can continuously operate. To this end, the battery charger 10 in this embodiment is designed to be capable of quickly charging the battery pack 50A or 50B in about 20 minutes.

Figure 4:
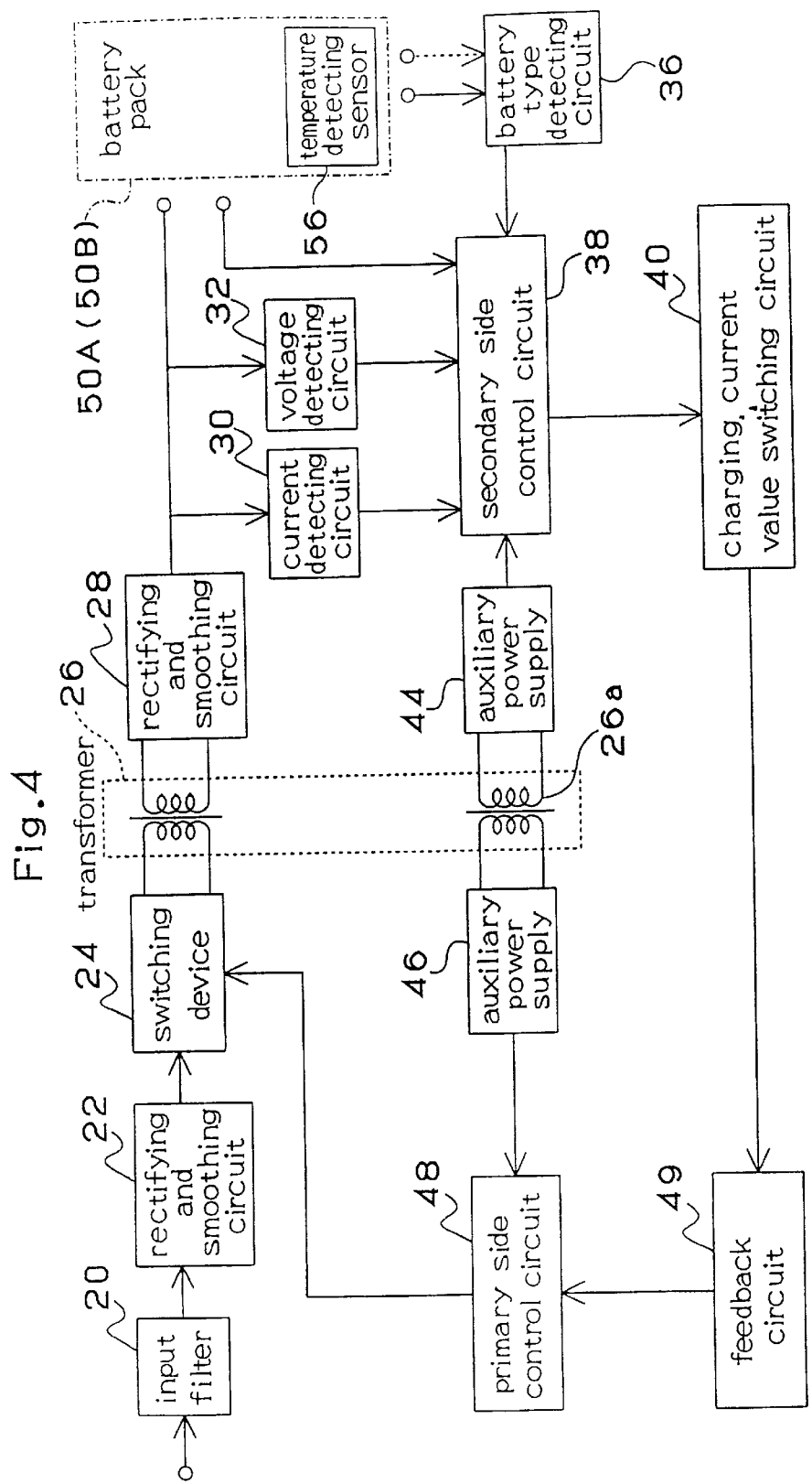
FIG. 4 is a block diagram showing a charging circuit in the battery charger shown in FIG. 1.

FIG. 4 is a circuit arrangement within the battery charger 10. In the circuit shown in FIG. 4, the noise of a commercial AC power supply is removed by an input filter 20, the AC power is rectified and smoothed by a rectifying and smoothing circuit 22, and switched on and off by a switching device 24 provided between the rectifying and smoothing circuit 22 and a transformer 26. The transformer 26 is provided with an auxiliary winding 26a from which an electromotive force is inputted into an auxiliary power supply 46, and applied to a primary side control circuit 48. The primary side control circuit 48 is provided for on/off controlling of the switching device 24. The switching device 24 controls a duty ratio of charging current, and the transformer 26 decreases commercial AC power voltage to a suitable voltage level.

The output of the transformer 26 is rectified and smoothed by the rectifying and smoothing circuit 28 and then applied to the battery pack 50A or 50B. By doing so, the battery cell (not shown) contained in the battery pack 50A or 50B is applied with charging current. A current detecting circuit 30 and a voltage detecting circuit 32 are connected between the rectifying and smoothing circuit 28 and the battery pack, from which a charging current signal and a charging voltage signal are inputted to a secondary side control circuit 38, respectively. A battery type detecting circuit 36 is provided at a position adjacent to the battery pack, from which a battery type signal is inputted to the secondary side control circuit 38. A temperature signal from a temperature detecting sensor 56 provided within the battery pack is inputted into the secondary side control circuit 38.

A power supply from an auxiliary power supply circuit 44 is applied to the secondary side control circuit 38. The secondary side control circuit 38 stores current value control maps, to be described later, obtains a temperature rise value from differentiating a temperature value outputted from the temperature detecting sensor 56, retrieves one of the maps based on the temperature value and the temperature rise value and obtains an allowable current value with which a battery can be charged while suppressing the battery temperature from rising. The secondary side control circuit 38 then determines whether or not a duty ratio is to be increased based on the above-stated charging current signal, and transmits the duty ratio to the primary side control circuit 48 through a charging current value switching circuit 40 and a feedback circuit 49, accordingly.

Figure 5:
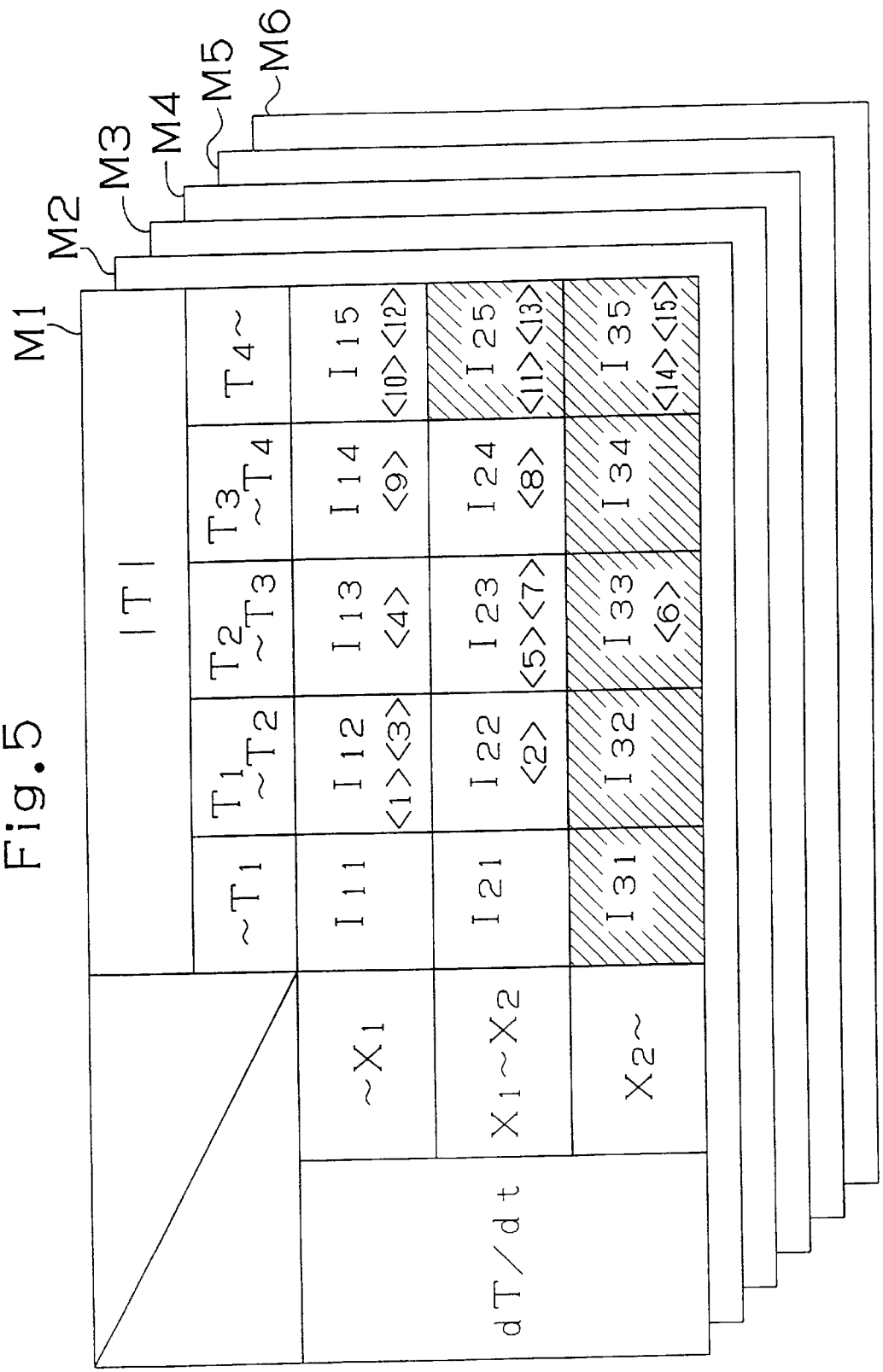
FIG. 5 is an explanatory view indicating the contents of maps retained in the charging circuit in the first embodiment.

The constitution of the maps for use in current control as stated above will be described with reference to FIG. 5.

As stated above, the secondary side control circuit 38 within the battery charger is provided with six types of maps, i.e., a map M1 for a 14.4 V nickel metal hydride battery, a map M2 for a 12V nickel metal hydride battery, a map M3 for a 9.6 V nickel metal hydride battery, a map M4 for a 14.4V nickel cadmium battery, a map M5 for a 12V nickel cadmium battery and a map M6 for a 9.6V nickel cadmium battery.

Normally, if charging current for a battery increases, charging time becomes shorter and temperature rise becomes larger. Conversely, if charging current decreases, charging time becomes longer and temperature rise becomes smaller. A nickel metal hydride battery, in particular, has characteristics that a temperature gradient (temperature rise value) greatly varies with charging current and the already charged capacity. Due to this, in this embodiment, battery charge is conducted while changing a current value so as to suppress temperature rise. In other words, the conventional battery charger charges a battery with a fixed current value, whereas the battery charger in this embodiment determines the state of a battery based on the absolute temperature and a temperature rise value, and charges the battery while changing a current value as high as possible with which the temperature rise of the battery can be suppressed, that is, while changing a current value according to the state of the battery.

In this embodiment, if battery temperature is high, relatively low charging current is applied to the battery. If the battery temperature is low, relatively high charging current is applied to the battery. Also, if temperature rise is large, relatively low charging current is applied to the battery. If temperature rise is small, relatively high charging current is applied to the battery.

Each of the maps is intended to conduct variable-control for current stated above and to specify an optimum current value. In each map, the horizontal axis indicates the absolute temperature T of a battery, and the vertical axis indicates a change in temperature dT/dt. Namely, if battery temperature is high and temperature rise is large (lower right in the map), relatively low charging current is applied to the battery. If battery temperature is high and temperature rise is small (upper right in the map), medium charging current is applied to the battery. If battery temperature is low and temperature rise is large (lower left in the map), medium charging current is applied to the battery. If battery temperature is low and temperature rise is small (upper left in the map), relatively high charging current is applied to the battery. In short, optimum current values are set in the respective regions in the map so as to satisfy both target charging time (about 20 minutes) and a target temperature which the battery reaches.

If a battery is charged with high current at low temperature (0° C. or lower), the performance of the battery deteriorates. Due to this, it is desirable to set low current values in the left row of the map so as not to deteriorate battery performance.

A suited region is retrieved from the absolute temperature T of the battery and a change in temperature dT/dt during battery charge based on the map. Charging current is then controlled based on a current value specified in the region. For instance, if battery temperature is between T3 and T4 and a change in battery temperature (or a temperature rise value) is between X1 and X2, then a current value in a region I24 is outputted.

Furthermore, the battery charger in this embodiment detects the completion of battery charge based on the movement of regions in the map. That is, the battery charger according to the conventional technique detects the completion of battery charge by monitoring either temperature or voltage while charging current is set at a fixed level. More specifically, the conventional battery charger detects a temperature rise value, a change in voltage and decrease in voltage after the battery is fully charged, thereby determining that the battery is fully charged. In the battery charger in this embodiment, by contrast, charging current is changed as stated above. Due to this, the battery charger in this embodiment cannot detect the completion of battery charge only by monitoring a temperature value and a change in temperature or a voltage value and a change in voltage. In this embodiment, therefore, the battery charger detects the completion of battery charge based on the movement of the regions in the map.

While a battery is being charged, the charging current value apparently moves at random in the regions of the map according to changes in temperature value and in temperature rise value. Specifically, before the battery is fully charged, if temperature increases or temperature rise increases and a relatively small charging current region is selected, that is, if the lower right region in the map is selected shown in FIG. 5, then temperature rise becomes smaller from the decrease of current and a charging current value corresponds to that in the upper regions on the map.

However, as the battery is close to a fully charged state, a temperature rise value increases due to the characteristics of the nickel metal hydride battery. That is to say, while a lower region in the map is selected because of large temperature rise, and relatively low current is applied to the battery, temperature rise remains large. Based on this principle, the battery charger in this embodiment measures current in the predetermined cycle (e.g., several hundred seconds' cycle). If the charging current value continuously (such as three consecutive times) enters regions I31, I32, I33, I34 and I35, in which temperature rise is large, and to a region I25 in which temperature is high and temperature rise is medium as indicated in hatching in the map, then the battery charger determines that battery charge is completed and stops charging the battery.

The battery charger in the first embodiment is provided with six types of maps according to types of batteries (i.e., a nickel metal hydride battery and a nickel cadmium battery) and battery voltages (i.e., 14.4V, 12V and 9.6V). It is noted that, during battery charge, the temperature of a nickel metal hydride battery tends to increases and the temperature of a nickel cadmium battery tends to increase less. This makes it difficult to control charging current for both the nickel metal hydride battery and the nickel cadmium battery based on the temperature rise values using a single map. Also, the tendency of temperature rise differs depending on battery voltages (14.4V, 12V and 9.6V). In other words, the high voltage battery pack contains many battery cells and heat generated inside the pack tends to diverge less. Conversely, the low voltage battery pack contains less battery cells and heat diverge greatly. Therefore, it is impossible to control battery packs of different voltages in the same manner based on temperature rise. Considering this, the battery charger in the first embodiment prepares six types of maps M1 to M6 in accordance with (two) battery types and (three) battery voltages.

The battery charge of the battery charger will be described in more detail with reference to the graph of FIG. 6.

Figure 6:
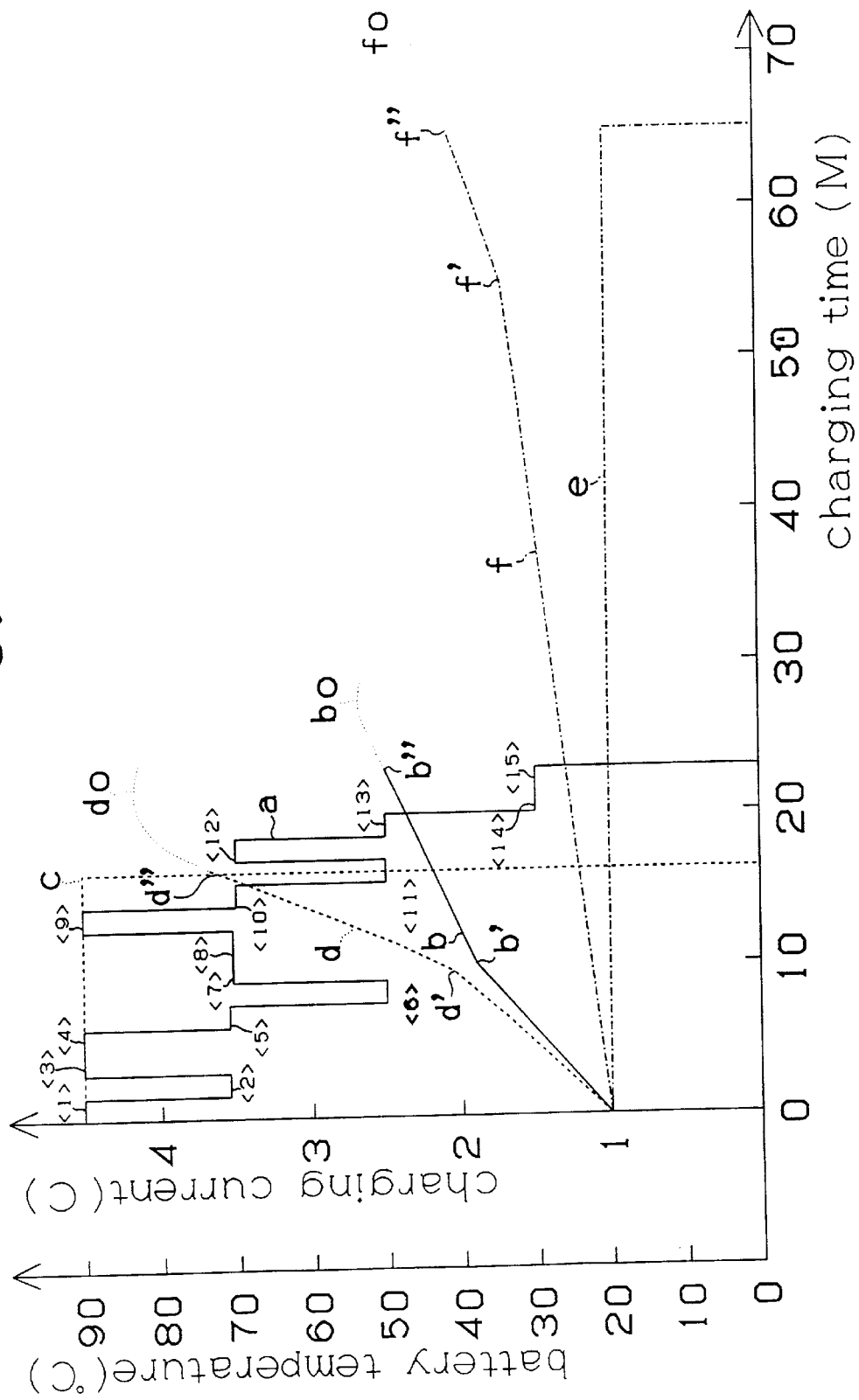
FIG. 6 is a graph showing changes in charging current and battery temperature controlled by the charging circuit in the first embodiment.

In FIG. 6, the horizontal axis indicates charging time and the vertical axis indicates charging current and battery temperature. FIG. 6 illustrates temperature rise in case of charging a nickel metal hydride battery for one hour and that in case of quickly charging the battery for comparison.

Conventionally, to avoid generating heat at the time of charging a nickel metal hydride battery, 1 C charge indicated by a dashed line e in FIG. 6 is conducted, i.e., a 2 AH nickel metal hydride battery is charged for about one hour (65 minutes in FIG. 6) by applying 2 A charging current to the battery. In case of 1 C charge, battery charge starts at a temperature of 20° C. as indicated by a dashed line f and can be completed at 40° C. It is noted that due to the characteristics of the nickel metal hydride battery, the quantity of temperature rise increases at a point, indicated by f', just before the completion of battery charge (after 55 minutes) and temperature rise further increases at a point, indicated by f", at which battery charge is completed (overshoot f0). The overshoot of the nickel metal hydride battery is considered to rely on the gradient of temperature rise at the time of completing battery charge. If the gradient f'-f" is slight, temperature rise caused by overshoot is small. Conversely, if the gradient is steep, that is, if temperature greatly increases at the final period of battery charge, then the degree of temperature rise caused by overshoot is large.

Meanwhile, a broken line c indicates current at the time of quickly charging a battery (4.5 C charge) with constant high current (9 A) so as to complete battery charge in about 20 minutes in the battery charger, according to the conventional technique. A broken line d indicates change in the temperature of the nickel metal hydride battery at the time of quickly charging the battery by the conventional battery charger. As indicated by the broken line d, if battery charge starts at 20° C., the temperature of the battery reaches 70° C., at which the service life of the nickel metal hydride battery is shortened disadvantageously, when the battery charge is completed. Furthermore, the temperature abruptly rises from a point, indicated by a reference symbol d', just before the completion of battery charge (after 11 minutes) and continues rising until a point indicated by a reference symbol d" at which battery charge is completed. Due to this, the temperature greatly rises further from a point d" at which battery charge is completed (overshoot d0), continues rising after the completion of battery charge due to the overshoot d0 and exceeds 80° C., thereby shortening the service life of the nickel metal hydride battery. In the graph of FIG. 6, the temperature of the battery is 20° C. at the start of battery charge and reaches 80° C. at the completion thereof, and the battery exhibits a temperature rise of 60° C. during battery charge. Owing to this, if the temperature of the nickel metal hydride battery is, for example, 30° C. at the start of battery charge, it rises by 60° C. to 90° C. or higher at which the performance of the battery greatly deteriorates.

A solid line a indicates a change in charging current by the battery charger in the first embodiment according to the present invention. A solid line b indicates a change in the temperature of the nickel metal hydride battery at the time the battery charger charges the battery. The battery charger 10 in this embodiment carries relatively low charging current if battery temperature is high and temperature rise is large, and carries medium charging current if battery temperature is high and temperature rise is small. Also, the battery charger carries medium charging current if battery temperature is low and temperature rise is large, and carries relatively high charging current if battery temperature is low and temperature rise is small. Thus, in order to adjust current based on the temperature of the nickel metal hydride battery and the temperature rise value thereof, battery charge starts at a temperature of 20° C. and temperature rise is suppressed to 50° C. or lower so as not to affect the battery life as indicated by the solid line b. In other words, current is adjusted to a maximum allowable current value so that battery temperature does not exceed a target temperature and that charging time is short.

As mentioned above, the battery charger 10 constantly changes charging current in accordance with battery temperature and temperature rise. That is, during an initial charging period, in which battery temperature is low and temperature rise is small, the battery charger 10 carries high current, and during a final charging period, in which battery temperature is high and temperature rise is large, the battery charger 10 carries relatively low charging current, thereby making the temperature rise value small just before the completion of battery charge. More specifically, temperature rise is small (or the gradient of temperature rise is slight) from a point, indicated by a reference symbol b', just before the completion of battery charge (after 11 minutes) until a point, indicated by a reference symbol b", at which battery charge is completed. Due to this, temperature rise after the completion of battery charge (overshoot b0) becomes small, so that heat generation during and after battery charge is suppressed to the same level (about 50° C.) as temperature rise during 1 C charge indicated by a dashed line f.

While 1 C charge indicated by the dashed line f is conducted, if battery temperature is high at the start of battery charge such as, for example, if battery charge starts at a battery temperature of 30° C., temperature rises by 30° C. to 60° C. at the time of the completion of battery charge. In this embodiment, on the other hand, battery temperature can be suppressed to 50° C. at the time of the completion of charge by limiting current in accordance with temperature. In particular, in case of a battery for use in a power tool, the battery capacity is fully consumed by continuously driving a motor with high current, and battery charge often starts in a state in which the temperature reaches high. The battery charger in this embodiment is capable of charging a high temperature nickel metal hydride battery so that battery temperature does not exceed a target temperature. Thus, the nickel metal hydride battery can be used repeatedly.

Figure 7:
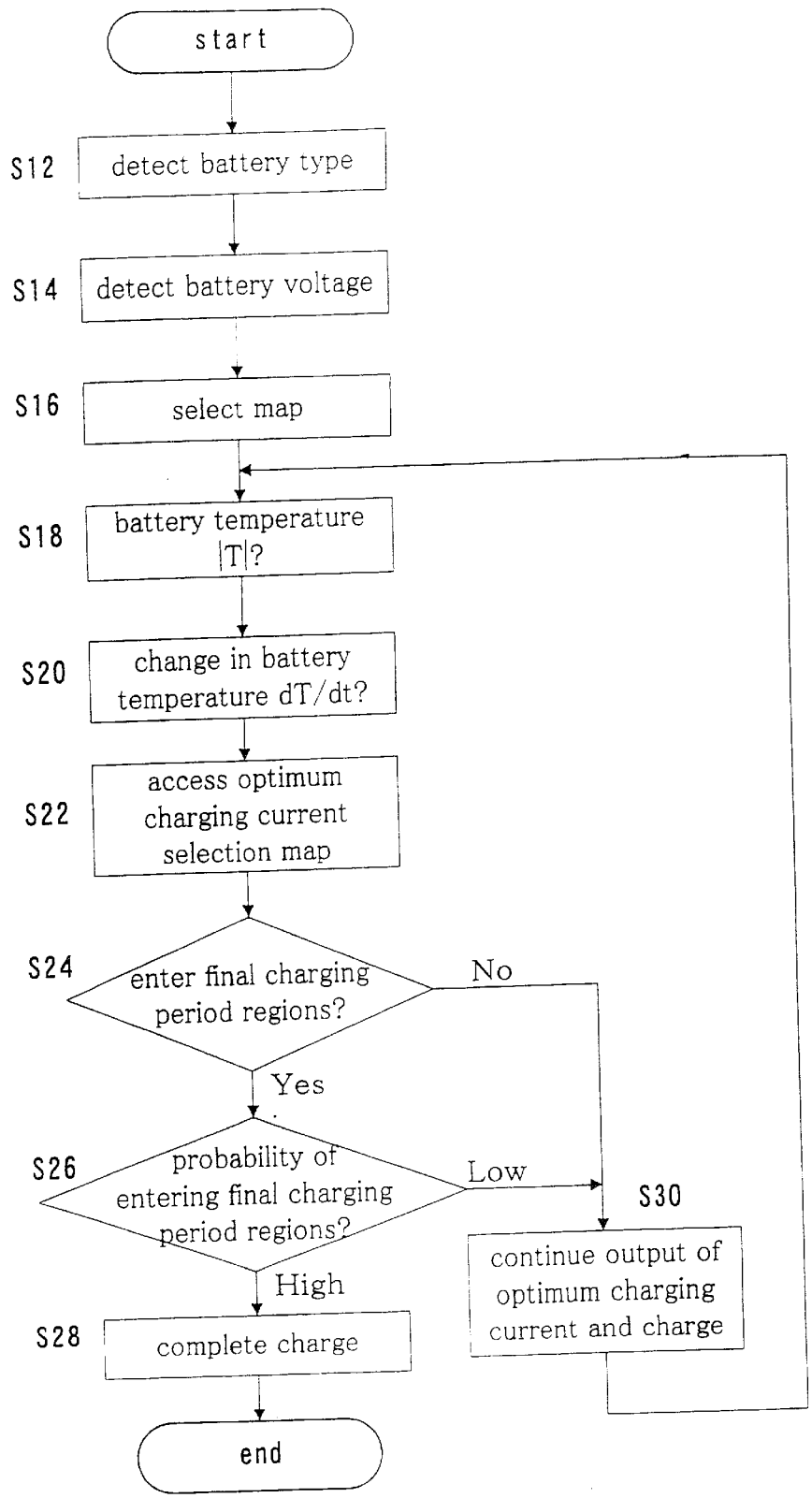
FIG. 7 is a flow chart showing processing by the charging circuit in the first embodiment.

Specific processing by the battery charger in this embodiment will be described based on a flow chart shown in FIG. 7 while referring to FIGS. 5 and 6.

When battery charge starts, the secondary side control circuit 38 (see FIG. 4) in the battery charger adjusts charging current and determines whether battery charge is completed in a predetermined cycle (in this case, a 100-second cycle for convenience; in practice a shorter cycle, i.e., a 10-second cycle). First, the type of a battery is judged from the output of the battery type detection circuit 36 (in a step S12) and the voltage of the battery is detected (in a step S14). The voltage is detected by carrying charging current for a predetermined time (e.g., one minute) and then detecting voltage by means of the voltage detecting circuit 32. Thus, the voltage of even a battery which voltage falls due to, for example, overdischarge can be appropriately detected. A map is then selected according to the detected battery type and voltage (in a step S16). In this example, it is assumed the battery pack 50A (nickel metal hydride battery, 14.4V) shown in FIG. 2A is installed at the battery charger and the map M1 shown in FIG. 5 is selected.

The secondary side control circuit 38 inputs the absolute temperature T of the nickel metal hydride battery of the battery pack 50A (in a step S18). The absolute temperature T inputted is thus differentiated and a change in battery temperature dT/dt is calculated (in a step S20). Based on the absolute temperature T and the change in temperature dT/dt, an optimum charging current value is selected from the map with reference to FIG. 5 (in a step S22). Since the absolute temperature T falls within a range of T1 to T2 as indicated by a cycle <1> and the change in temperature dT/dt is X1 or less, a region I12 is selected and relatively high current for 4.5 C charge (9 A) is applied as indicated by the solid line a of FIG. 6.

Thereafter, the secondary side control circuit 38 determines whether the absolute temperature T and the change in battery temperature dT/dt enters regions I31, I32, I33, I34 and I35, in which temperature rise is large, and region I25, in which temperature is high and temperature rise is medium, as indicated in hatching (in a step S24). In this case, since the current value is not in final charging period regions ('No' in the step S24), process returns to a step S18 and the control of charging current is continued. In a cycle <2> after 100 more seconds, since relatively high current is carried in the cycle <1> mentioned above, the change in temperature dT/dt increases (X1 to X2). A region I22 is then selected and a medium current value (3.5 C) is selected, accordingly. Since the medium current value is selected in the cycle <2>, the change in temperature dT/dt becomes X1 or less. In a cycle <3>, a region I12 is selected and a relatively high charging current value is selected again.

As stated above, if battery charge is continued while changing the current value in accordance with the absolute temperature T and change in temperature dT/dt, the change in temperature gradually increases. Then, in a cycle <6>, the change in temperature dT/dt exceeds X2 and the absolute temperature T and the change in temperature dT/dt enter a region I33, as shown in FIG. 5. In this case, the determination result of the step 24 for determining whether the current value falls within the above-stated final charging period regions (regions I31, I32, I33, I34, I35 and I25) is Yes then it is determined whether there is a high probability that the current value falls within the final charging period regions (in a step S26). Specifically, if the current value is in the final charging period regions for three consecutive cycles, then it is determined that the probability of entering the final charging period regions is high. Here, by narrowing down the current value in the cycle <6>, the absolute temperature T decreases to T2 to T3, the change in temperature dT/dt decreases to X1 to X2, and the absolute temperature T and the change in temperature dT/dt enter the region I23 in the next cycle <7>. Due to this, the probability entering the final charging period regions is determined as 'Low' in the step S26 and battery charge is continued while changing charging current in a step S30.

In the meantime, if the absolute temperature T and the change in temperature dT/dt enter the region I25 belonging to the final charging regions in a cycle <13>, they enter the region I35 belonging to the final charging regions in the next cycle <14> and enter the region I35 in the next cycle <15>. In this way, if the absolute temperature T and the change in temperature dT/dt enter the final charging period regions three consecutive times, the probability of entering the final charging period regions is determined as 'High' in the step 26 and battery charge is completed (in a step S28), thereby finishing all of the processing steps.

In the above-stated example, since for convenience, description is given with a cycle time set at 100 seconds, it is determined that the probability is high if the absolute temperature T and the change in temperature dT/dt enter the final charging period regions three consecutive times. In case of making a cycle time shorter in various manners, it is possible to determine that the probability of entering the final charging period regions is high. As for a 10-second cycle, for instance, it is determined that the probability is high if the absolute temperature T and the change in temperature dT/dt enter the final charging period regions in eight out of ten cycles. Also, it is possible to determine that the probability is high if the absolute temperature T and the change in temperature dT/dt enter the final charging period regions in eight out of ten cycles, or if the absolute temperature T and the change in temperature dT/dt enter the final charging period regions in five consecutive cycles.

As stated above, the battery charger according to the conventional technique for charging a nickel cadmium battery detects the completion of battery charge by making a current value constant and monitoring at least one of temperature, change in temperature, voltage and change in voltage. The nickel metal hydride battery, however, generates high heat while being charged. Due to this, it is difficult to charge the nickel metal hydride battery quickly to 100% capacity (in about 20 minutes) without causing overdischarge by means of the conventional technique. The battery charger in this embodiment, by contrast, continuously monitors the absolute temperature T and the change in temperature dT/dt while narrowing down charging current in accordance with the battery type and battery voltage. It is therefore possible to charge a nickel metal hydride battery to 100% capacity without causing overdischarge and also, to charge a nickel cadmium battery in a short time.

That is to say, the battery charger in the first embodiment employs a map, in which allowable current values with which a battery can be charged while suppressing temperature rise in accordance with the type of the battery are mapped based on the temperature values of the battery and the temperature rise values, depending on the type of the battery. Specifically, the map for the corresponding battery type is retrieved from a battery temperature and a temperature rise value, an allowable current value with which a battery can be charged while suppressing the temperature rise of the battery is obtained and the battery is charged with the allowable current value. This makes it possible to charge in a short time a nickel metal hydride battery, which temperature tends to rise during charge, without deterioration due to temperature rise. In addition, since the temperature rise of the nickel metal hydride battery is large and the battery is charged with a relatively low current value just before the completion of battery charge, "overshoot" after the completion thereof can be suppressed. Besides, a nickel cadmium battery, which temperature rise is relatively small, can be charged in a short time by applying high current to the battery.

Particularly, the completion of battery charge is determined based on whether or not a temperature rise value is relatively high and the frequency with which a relatively low allowable current value is outputted from the map is high, i.e., the completion of battery charge is determined using a map according to the battery type and voltage based on whether or not temperature rise is large and the temperature rise continues to be large even if a charging current value is lowered. Thus, 100% charge is possible without overdischarge irrespective of the battery type and voltage.

In other words, the temperature of the nickel metal hydride battery tends to rise while being charged and a high voltage battery pack containing many battery cells tends to accumulate heat inside. Conversely, a low voltage battery pack containing less battery cells tends to diverge internal heat and it is difficult to charge batteries in the same manner as the high voltage battery pack. That is why the battery charger in the first embodiment employs a map according to the battery type and voltage to allow every battery to be charged in a short time without deterioration in battery performance due to temperature rise.

Figure 8:
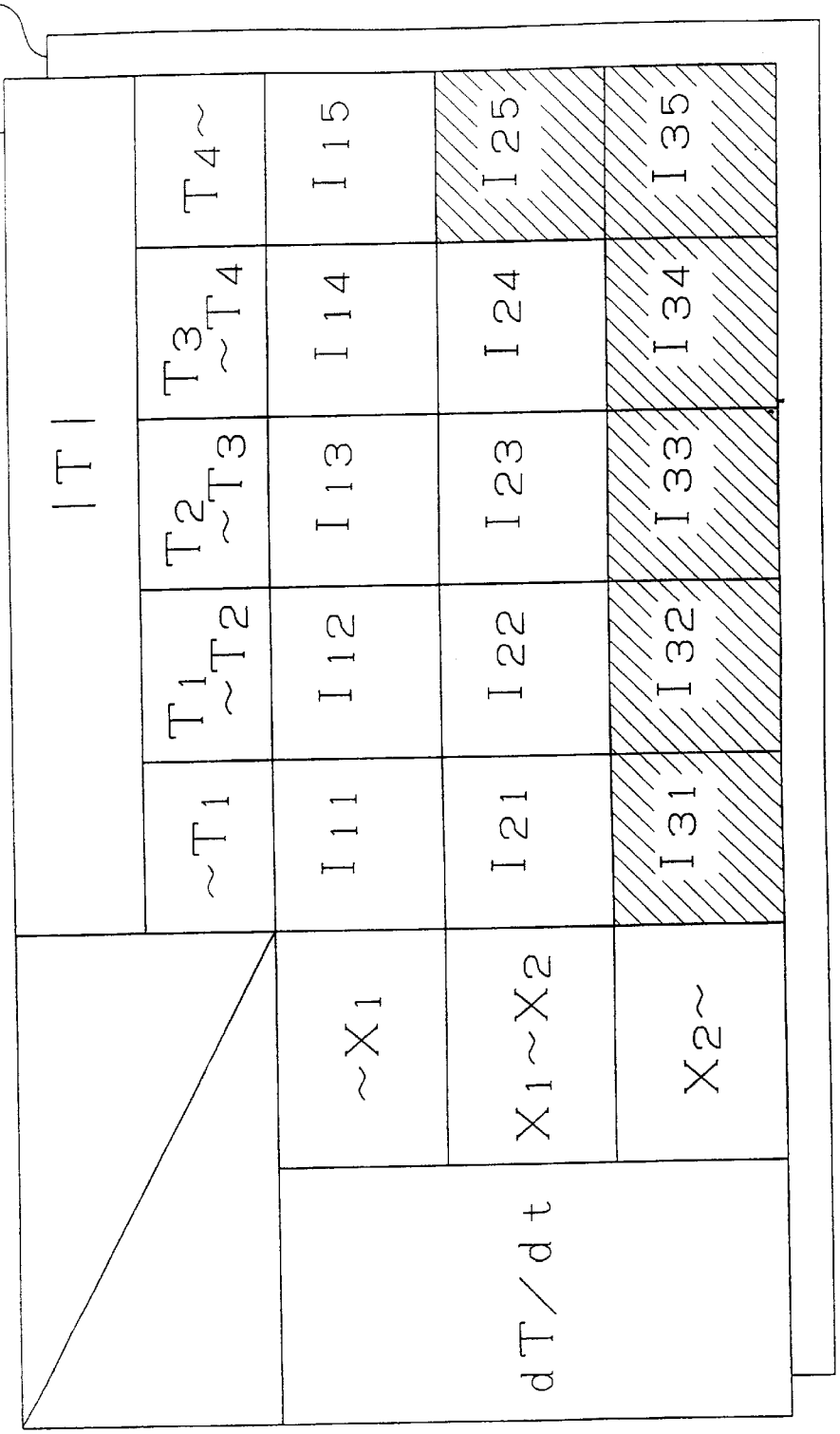
FIG. 8 is an explanatory map indicating the contents of maps retained in a battery charger in the second embodiment according to the present invention.

Next, description will be given to a battery charger in the second embodiment according to the present invention with reference to FIGS. 8 to 10. A plurality of maps are prepared in accordance with battery types and battery voltages for the battery charger in the first embodiment. In the battery charger in the second embodiment, by contrast, a plurality of maps are prepared in accordance with residual battery capacities. As shown in FIG. 8, two types of maps, i.e., a map M11 for a residual capacity of 30% and a map M12 for a residual capacity of 70% are prepared. The 30% residual capacity map M11 is used if the battery capacity is 50% or less and the 70% residual capacity map M12 is used if the battery capacity exceeds 50%.

Figure 9:
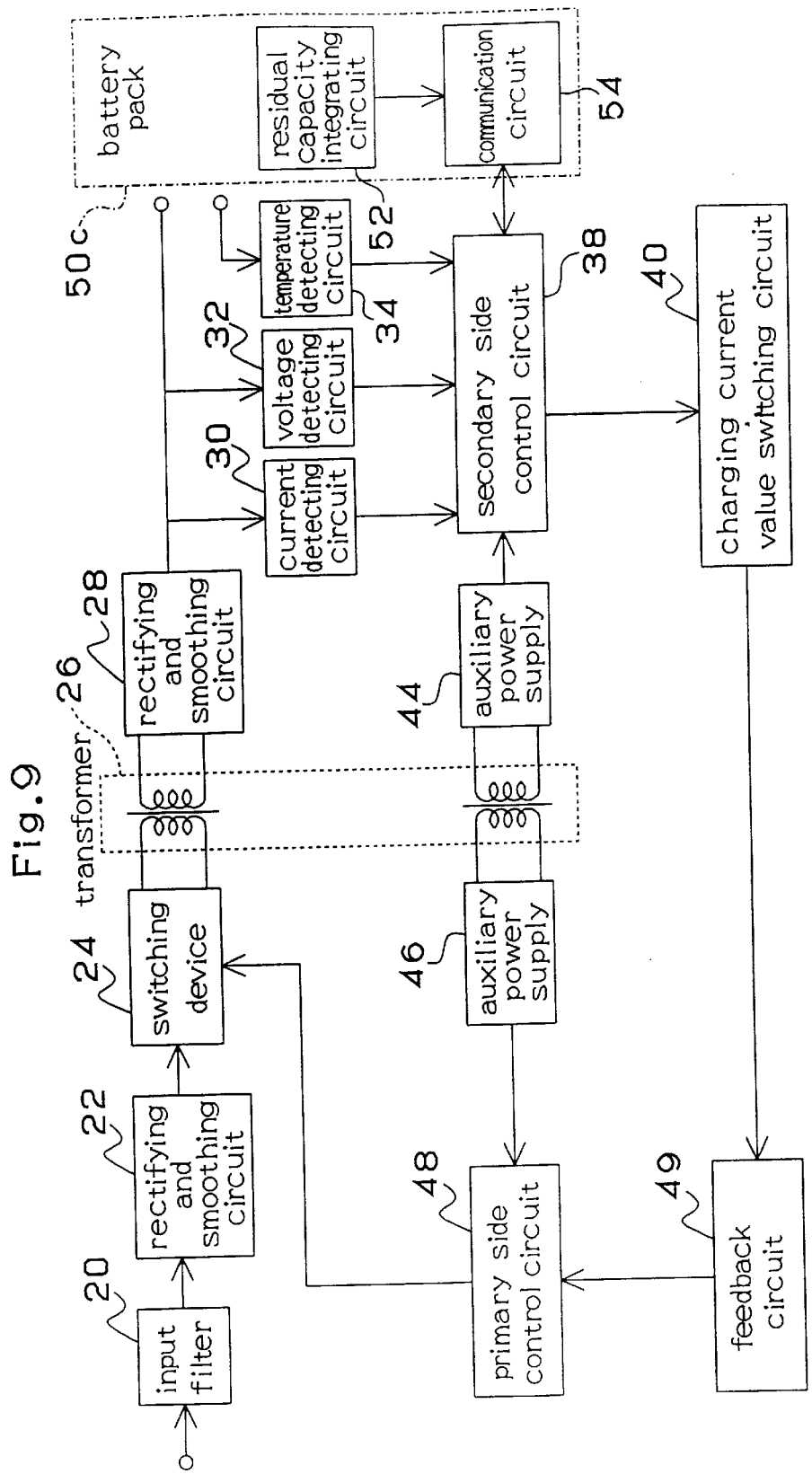
FIG. 9 is a block diagram showing a charging circuit in the battery charger in the second embodiment.
Figure 10:
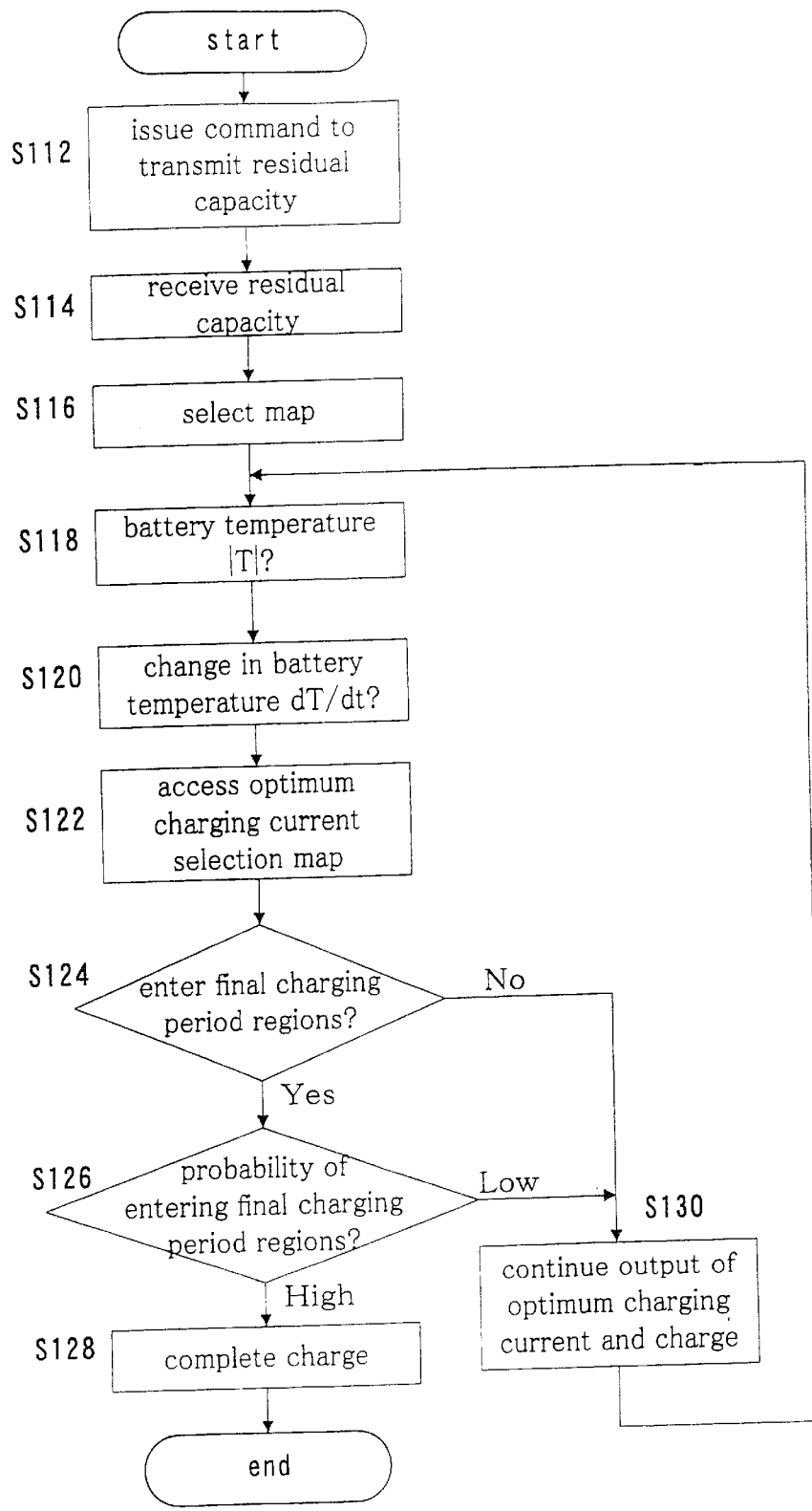
FIG. 10 is a flow chart showing processing by the charging circuit in the second embodiment.

FIG. 9 shows the battery charger and a batter pack 50C in the second embodiment. The battery pack 50C contains a nickel metal hydride batteries(not shown). The battery pack 50C includes a residual capacity integrating circuit 52 which integrates a residual battery capacity by integrating the charging current of the nickel hydride battery when the battery is installed at the battery pack 50C, and by subtracting the current used when the battery is installed at a power tool (see FIG. 3), and a communication circuit 54 which transmits the residual capacity obtained by the residual capacity integrating circuit 52, to the battery charger side. The circuit arrangement of the battery charger is the same as that in the first embodiment described above with reference to FIG. 4, which description will not,therefore, be given herein.

Next, processing by the secondary side control circuit 38 in the battery charger in the second embodiment will be described with reference to FIG. 10.

When battery charge starts, the secondary side control circuit 38 (see FIG. 9) in the battery charger adjusts charging current and determines whether the battery charge is completed in predetermined cycles. First, the secondary side control circuit 38 commands the communication circuit 54 of the battery pack 50C to transmits a residual battery capacity (in a step S112) and receives the residual battery capacity transmitted from the communication circuit 54 (in a step S114). The circuit 38 then selects a map shown in FIG. 8 in accordance with the received residual battery capacity (in a step S116). It is assumed that a residual battery capacity of 40% is transmitted from the battery pack 50C and that the map M11 for 30% residual capacity shown in FIG. 5 is selected. Thereafter, the battery is charged based on the map M11 (in steps S118 to 130). Processing in the steps S118 to S130 is the same as those in the steps S18 to S30 in the first embodiment described above with reference to FIG. 7, which description will not, therefore, be given herein.

The battery charger in the second embodiment employs an allowable current value with which a battery can be charged with the temperature rise of the battery suppressed, while making the map in which current values are mapped based on battery temperature values and battery temperature rise values, correspondent to residual battery capacities. That is to say, a map corresponding to the residual battery capacity is obtained retrieved from the battery temperature value and temperature rise value, an allowable current value, with which the battery can be charged with the temperature rise of the battery suppressed, and the battery is charged with the allowable current value. By doing so, it is possible to charge in a short time, the nickel metal hydride battery, which temperature tends to rise during charge, in accordance with the residual battery capacity without causing deterioration due to temperature rise.

In particular, the completion of battery charge is determined based on whether or not a temperature rise value is relatively high, and the frequency with which a relatively low allowable current value is outputted from a map corresponding to the residual battery capacity, is high, i.e., based on whether or not temperature rise is large and the temperature rise is continued to be large even if a charging current value is lowered. Thus, 100% charge is possible in accordance with the residual battery capacity without causing overdischarge. Further, the resolution of the map for high residual capacity enhances substantially. Specifically, current values are mapped so as to correspond to a lower capacity value (30%) in the map M12 for 70% residual capacity and its resolution is substantially higher than the map M11 for 30% residual capacity, with the result the charging current detecting accuracy increases up to 100%.

Figure 11:
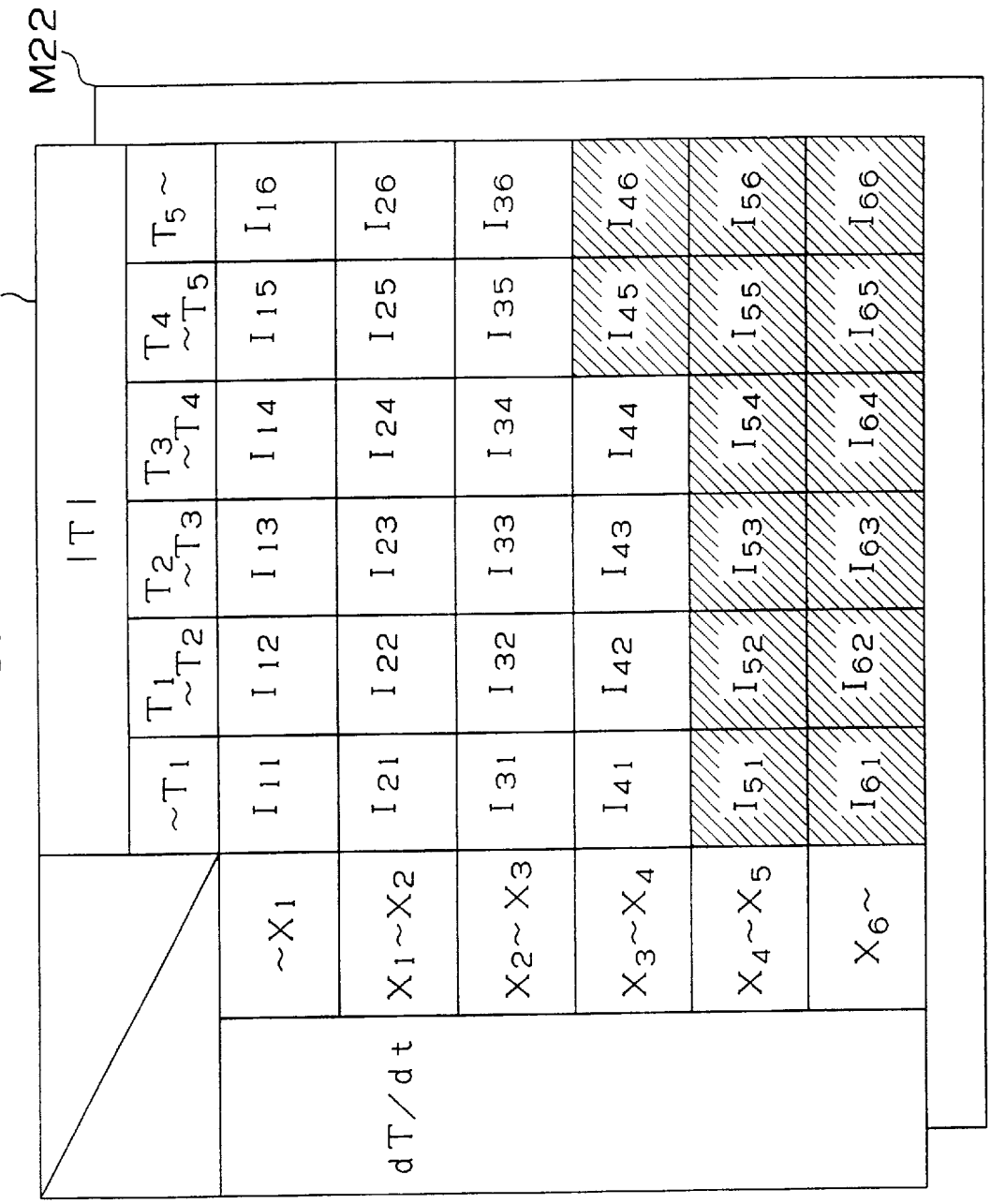
FIG. 11 is an explanatory map indicating the contents of maps retained in a charging circuit in the third embodiment according to the present invention.

Next, description will be given to a battery charger in the third embodiment according to the present invention with reference to FIGS. 11 to 13. A plurality of maps are prepared for the battery charger in the first embodiment in accordance with battery types and battery voltages. In the battery charger in the third embodiment, by contrast, a plurality of maps are prepared for the battery charger in accordance with environmental temperature during charge. That is, two types of map, i.e., a map M21 for low temperature and a map M22 for high temperature, are prepared as shown in FIG. 11. If environmental temperature (or outside air temperature in a place in which the battery charger is provided) is below 25° C., the low temperature map M21 is used. If 25° C. or higher, the high temperature map M22 is used. That is, in this embodiment, battery temperature is detected and then charging current is determined. Due to the environmental temperature, the battery is cooled in a different manner and a single map might not be able to appropriately control the quantity of charging current. For that reason, two types of maps, i.e., a map for high temperature and a map for low temperature are prepared in this embodiment.

The contents of the low temperature map M21 and the high temperature map M22 will be described in more detail with reference to FIG. 12.

FIG. 12A shows the content of the low temperature map M21. A region such as, for instance, a region I11 in the map of FIG. 11 corresponds to the region I11 in FIG. 12A. If environmental temperature is low and battery temperature is high, the battery tends to be cooled and a change in temperature dT/dt to be measured is small. Owing to this, in upper right regions in the map, in which the absolute temperature values are high and the temperature rise values are low, the resolution of the absolute temperature T is increased (i.e., the lateral length of the regions such as I15, I16, I25 and I26 are shortened) and the resolution of the temperature rise value dT/dt is increased (i.e., the vertical lengths of the regions such as I15, I16, I25 and I26 are shortened). In addition, the vertical lengths of final charging period regions in the right of the map(such as I45, I46, I55, I56, I65 and I66) are expanded, thereby allowing optimum determination as to the completion of battery charge at low temperature.

FIG. 12B shows the content of the high temperature map M22. If environmental temperature is high and battery temperature is low, the battery is not cooled by the outside air. Due to this, a temperature rise value dT/dt to be measured becomes higher. Considering this, the resolution of lower left side in the map is increased (i.e., the vertical lengths, for instance, of regions I41, I42, I51, I52, I61 and I62 are shortened) and the vertical lengths of the final charging period regions are narrowed, so as to allow optimum determination at high temperature as to the completion of battery charge.

Figure 13:
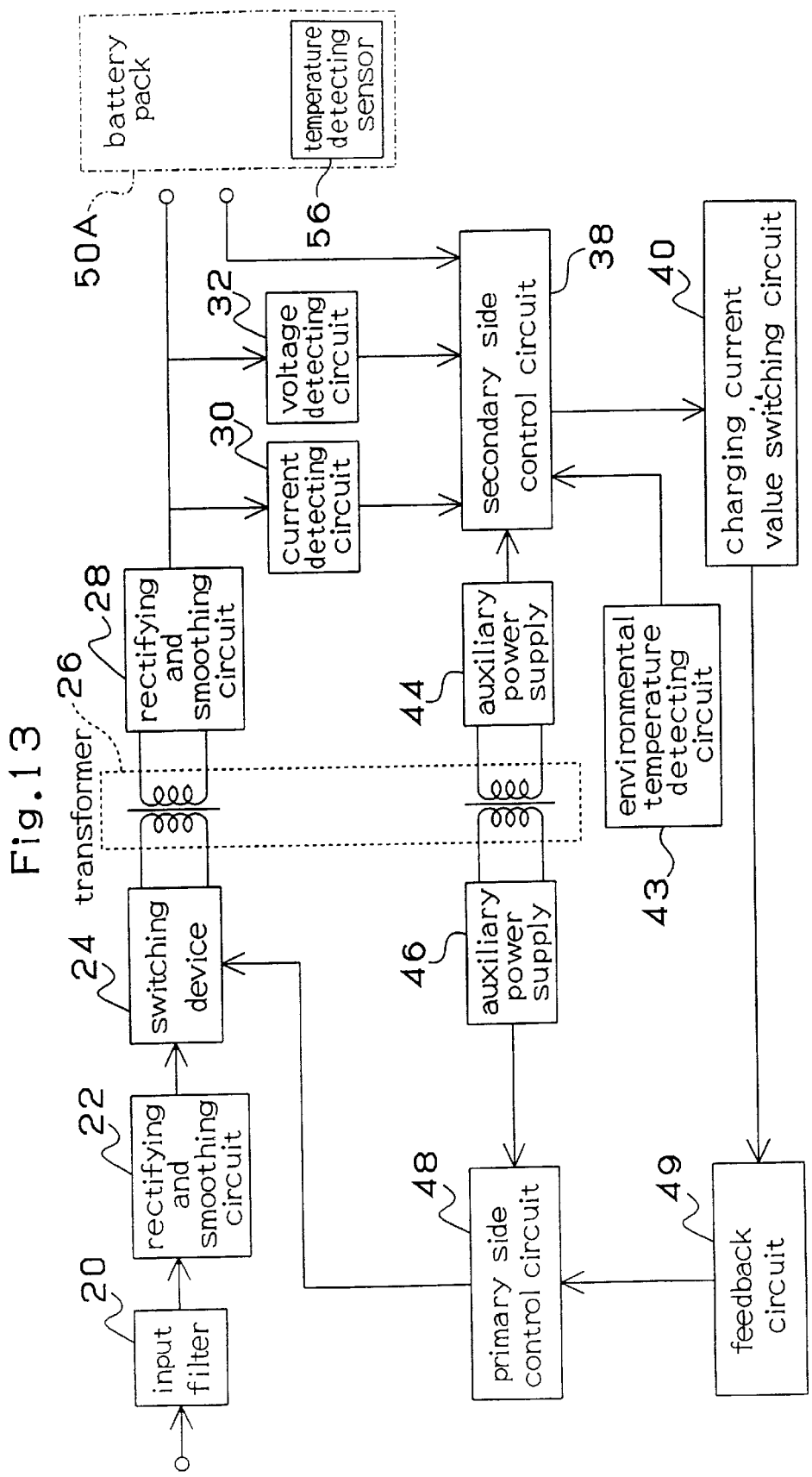
FIG. 13 is a block diagram showing a charging circuit in a battery charger in the third embodiment.

FIG. 13 shows the battery charger in the third embodiment. The battery charger includes an environmental temperature detecting circuit 43 for detecting environmental temperature. The detected temperature is outputted to the secondary side control circuit 38. The remaining circuit arrangement of the battery charger is the same as that in the first embodiment described above with reference to FIG. 4, which description will not therefore be given herein.

Figure 14:
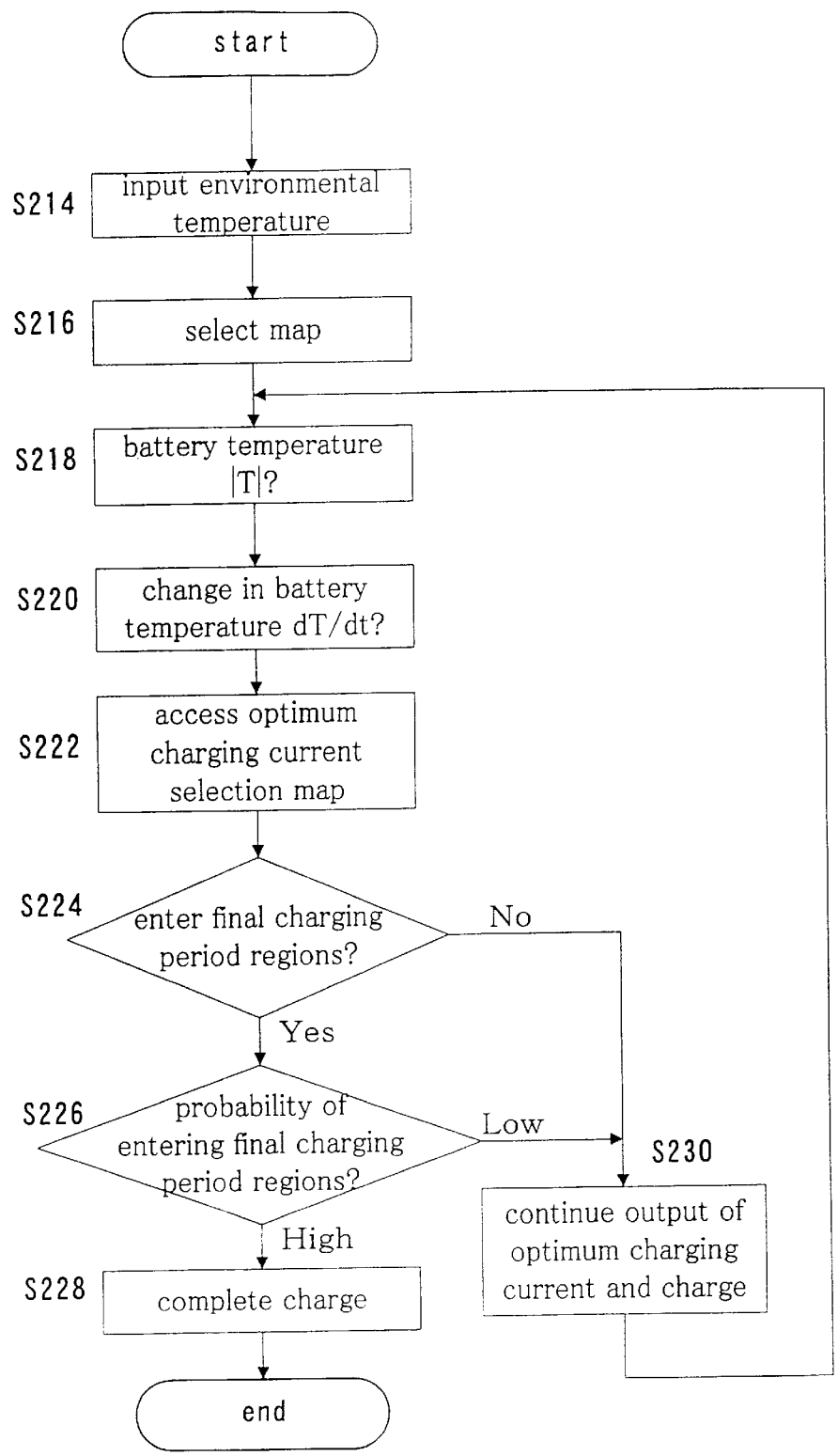
FIG. 14 is a flow chart showing processing by the battery charger in the third embodiment.

Processing by the secondary side control circuit 38 in the battery charger in the third embodiment will be described with reference to FIG. 14.

When battery charge starts, the secondary side control circuit 38 (see FIG. 13) in the battery charger adjusts charging current and determines the completion of battery charge in predetermined cycles. First, an environmental temperature is inputted (in a step S214) and a map is selected in accordance with the inputted environmental temperature (in a step S216). In this example, it is assumed that the circuit 38 detects that the environmental temperature is 30° C. and that the map M22 is selected in accordance with the detected temperature. Thereafter, the battery is charged based on the map M22 (in steps S218 to 230). Processing in the steps S218 to S230 is the same as those in the steps S18 to S30 in the first embodiment described above with reference to FIG. 7, which description will not therefore be given herein.

The battery charger in the third embodiment employs an allowable current value while making a map with which a battery can be charged with the temperature rise of the battery suppressed, in which current values are mapped based on battery temperature values and temperature rise values, correspondent to environmental temperatures. Specifically, the map is obtained, retrieved from the battery temperature and temperature rise value, an allowable current value, with which the battery can be charged with the temperature rise of the battery suppressed, and the battery is charged with the allowable current value. Although the temperature of a nickel hydride battery tends to rise during charge and the battery temperature rises in a different manner according to environmental temperature, the battery can be charged in a short time without causing deterioration due to temperature rise, irrespective of the environmental temperature.

In particular, the completion of battery charge is determined based on whether or not a temperature rise value is relatively high and the frequency, with which a relatively low allowable current value is outputted from a map in accordance with the environmental temperature, is high, i.e., based on whether or not temperature rise is large and it remains large even if a charging current value is lowered. Thus, 100% charge is possible without causing discharge, irrespective of the environmental temperature.

Next, description will be given to a battery charger in the fourth embodiment according to the present invention with references to FIGS. 15 to 20.

Figure 15:
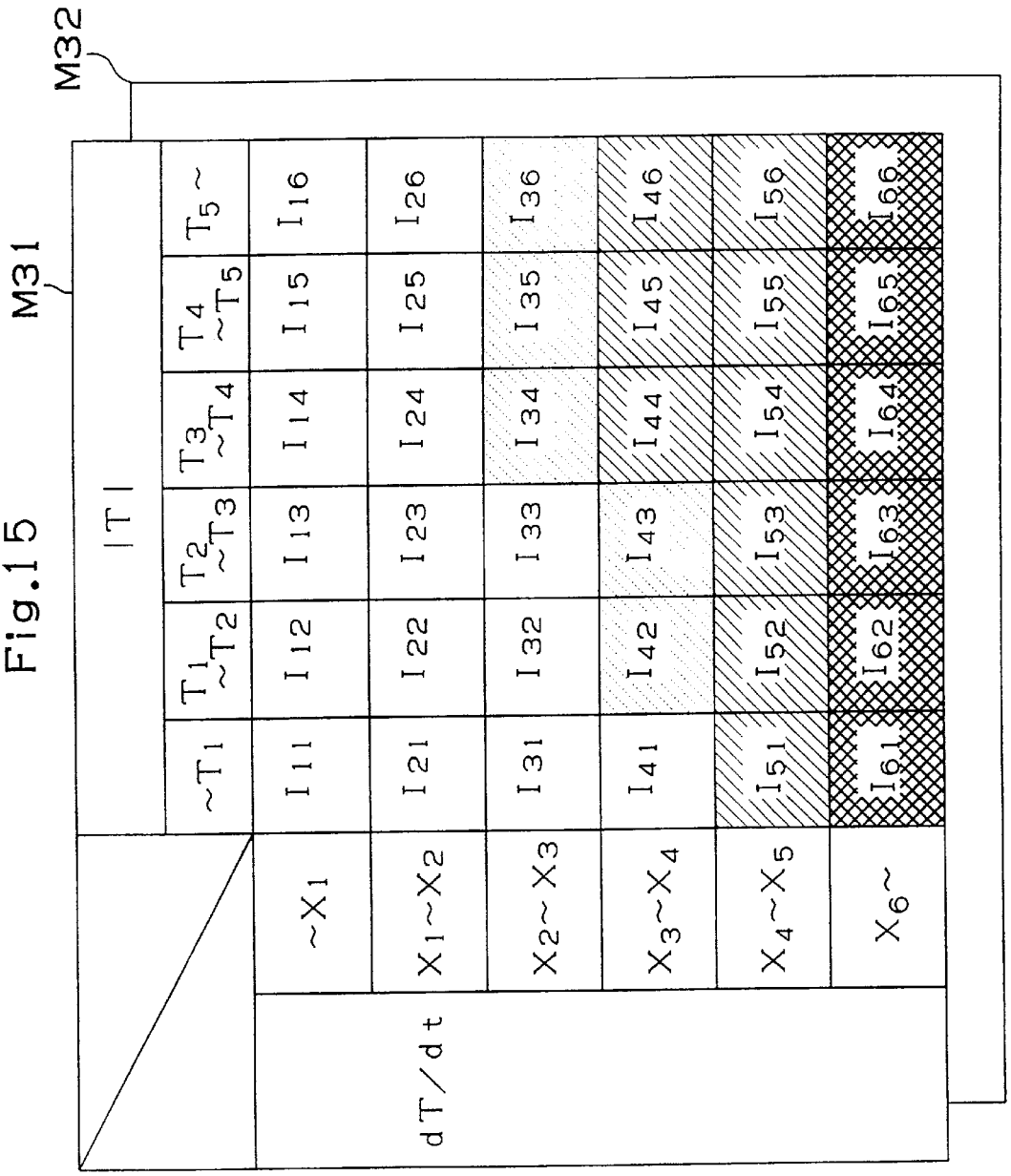
FIG. 15 is an explanatory map indicating the contents of maps retained in a battery charger in the fourth embodiment according to the present invention.

In the battery charger in the third embodiment stated above, a plurality of maps are prepared in accordance with environmental temperatures. In the battery charger in the fourth embodiment, an ordinary temperature map M31 (a trans temperature of 60° C. or lower) and a high temperature map M32 (a trans temperature of 60° C. or higher) are prepared in accordance with the temperatures of the battery charger as shown in FIG. 15. In the high temperature map M32, charging current is decreased to the level at which generated heat does not cause a malfunction in the battery charger, that is, a maximum allowable current value is set. For reference, the battery charger according to the conventional technique has a charging capacity with which two batteries can continuously be charged so as to provide a power supply circuit at low cost. Therefore, in case of continuously charging three or more batteries, a protection unit operates to thereby extremely lower charging current in the conventional battery charger. As a result, if batteries are continuously charged, it takes quite a long time to charge the third and the following batteries. The battery charger in the fourth embodiment, by contrast, employs maps corresponding to the temperatures of the battery charger. Due to this, when the temperature of the battery charger rises, charging current is lowered to the level at which generated heat does not cause a malfunction in the battery charger, that is, the third and the following batteries are charged in a short time by carrying the maximum allowable current.

In the battery charger in the first embodiment, nickel metal hydride battery maps and nickel cadmium battery maps are individually prepared. In the battery charger in the fourth embodiment, by contrast, both the ordinary temperature map M31 and high temperature map M32 are adapted for a nickel metal hydride battery. Using the nickel metal hydride battery maps, not only a nickel metal hydride battery (battery pack 50A) but also a nickel cadmium battery (battery pack 50B) are charged. The nickel cadmium battery can appropriately be charged using the nickel metal hydride battery maps by correcting the input and output.

Furthermore, in the battery charger in the fourth embodiment, regions in the maps are weighted at the time of determining the completion of battery charge. Specifically, the battery chargers in the first to third embodiments simply add the frequencies, indicated in hatching, with which the absolute temperature T and the change in temperature dT/dt enter regions which tends to occur at the time of the completion of charge. The battery charger in the fourth embodiment adds "1" to a counter when the absolute temperature T and the change in temperature dT/dt enter regions I42, I43, I34, I35 and I36 which tends to occur in the initial period of the completion of battery charge, and adds "2" to the counter when the absolute temperature T and the change in temperature dT/dt enter regions I51, I52, I53, I44, I45, I46, I54, I55 and I56 which tends to occur in the medium period of the completion of charges and adds "3" to the counter when the absolute temperature T and the change in temperature dT/dt enter regions I61, I62, I63, I64, I65 and I66 which tends to occur in the final period of the completion of battery charge. By doing so, the battery charger in the fourth embodiment detects that the battery can accurately be charged further to target capacity.

Moreover, in addition to the determination of the completion of battery charge using maps the battery charger in the fourth embodiment stops charging the battery based on the integral value of the absolute temperature of the battery, a temperature rise value, voltage drop which occurs at the final charging period and charging current.

Figure 16:
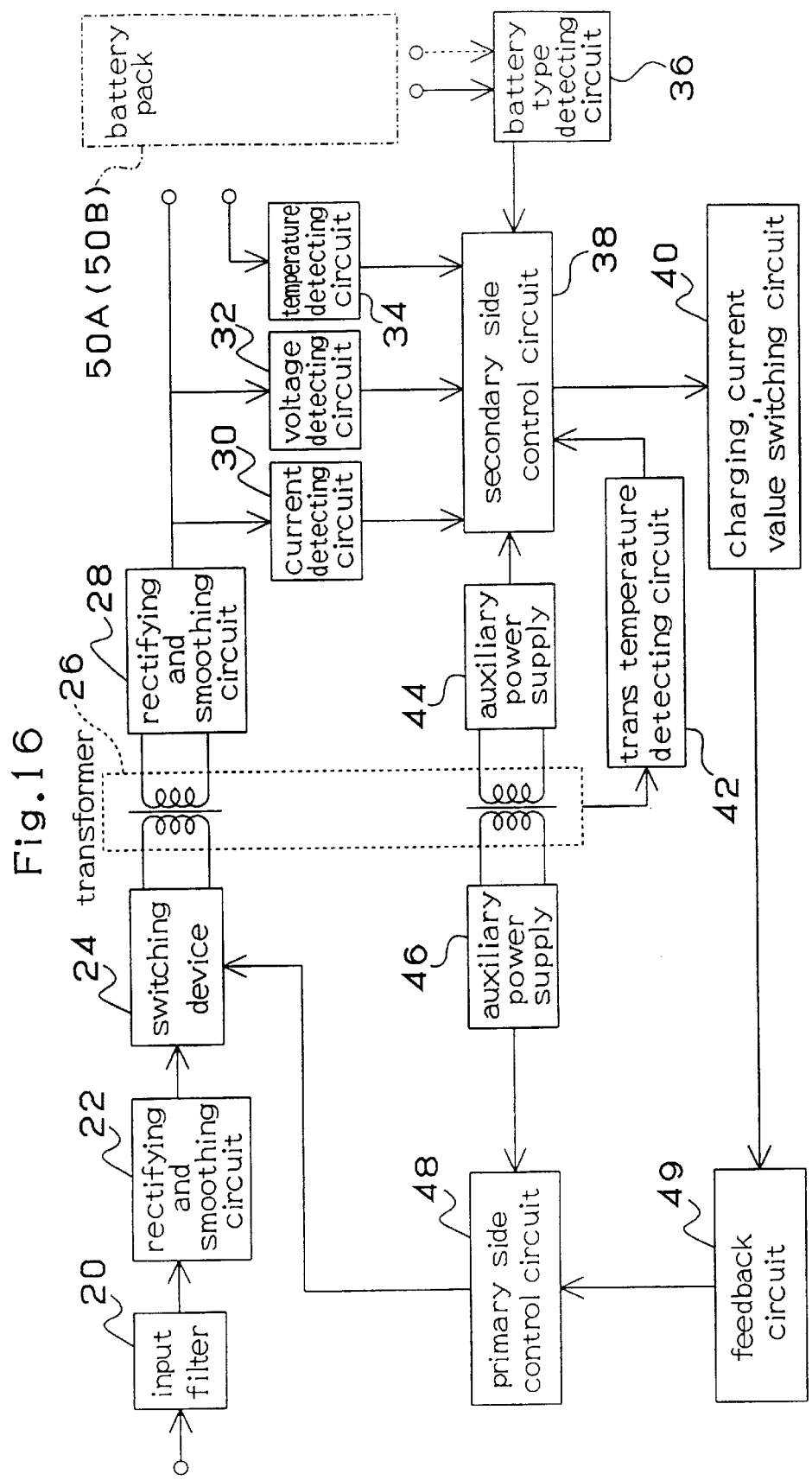
FIG. 16 is a block diagram showing a charging circuit in the battery charger in the fourth embodiment.

FIG. 16 shows the battery charger in the fourth embodiment. The battery charger includes a trans temperature detecting circuit 42 for detecting the temperature of a transformer 26 and the detected temperature is outputted to the secondary side control circuit 38. The remaining circuit arrangement of the battery charger is the same as that in the first embodiment described above with reference to FIG. 4, which description will not, therefore, be given herein. The reason for detecting the temperature of the transformer 26 is as follows. A switching device 24 and the like, generate heat as in case of the transformer 26. The semiconductor device which constitute the switching device resists heat relatively stronger, whereas the insulating property of the winding of the transformer 26 deteriorates at 100° C. or higher. The transformer 26 is most sensitive to heat among the constituent elements of the battery charger.

Figure 17:
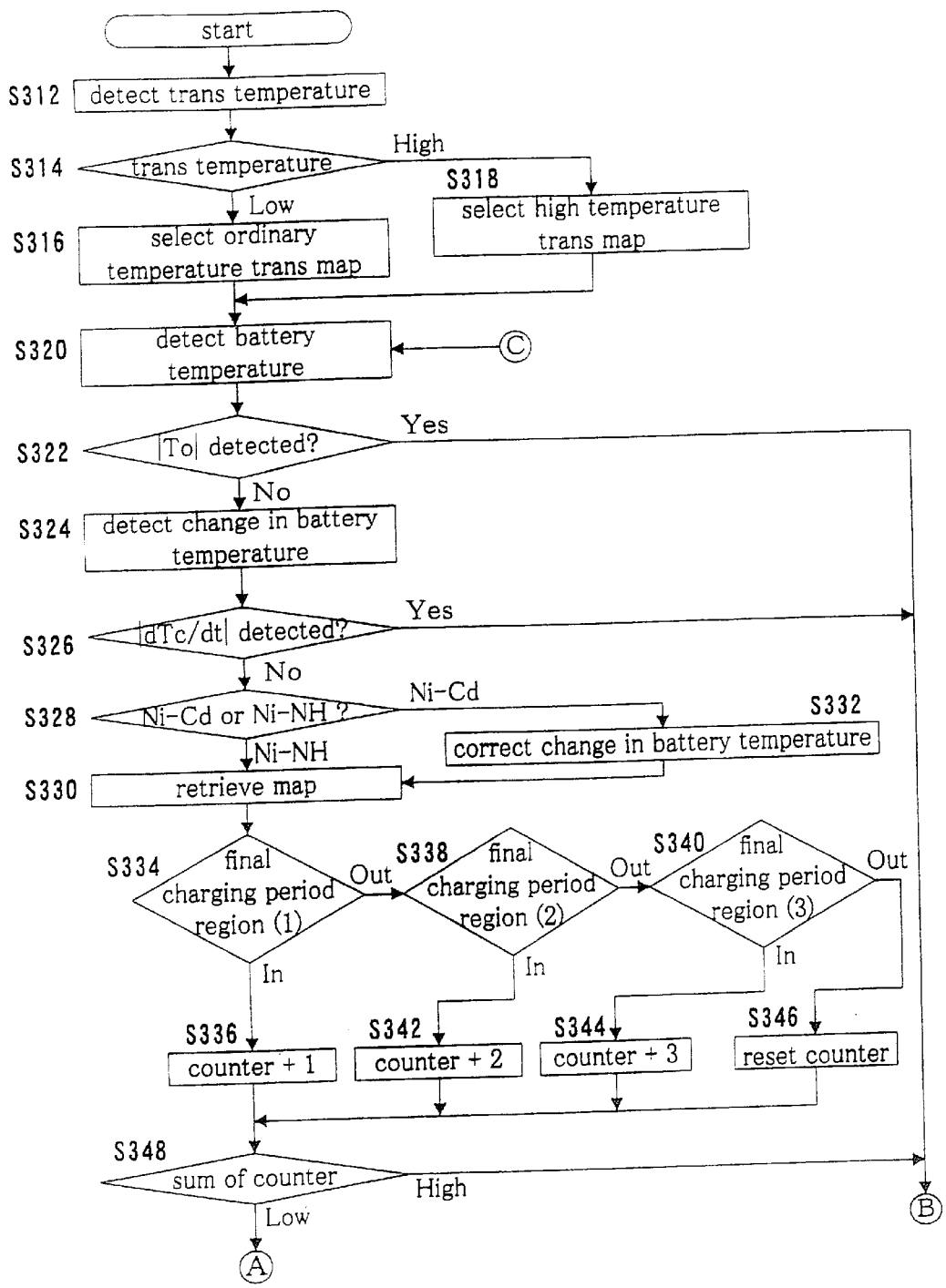
FIG. 17 is a flow chart showing the first half of processing by the charging circuit in the fourth embodiment.

Processing by the secondary side control circuit 38 in the battery charger in the fourth embodiment will be described with reference to FIGS. 17 and 18.

When battery charge starts, the secondary side control circuit 38 in the battery charger adjusts charging current and determines the completion of battery charge in predetermined cycles. First, a trans temperature is inputted (in a step S312) and it is determined whether the trans temperature is ordinary temperature (below 60° C.) (in a step S314). If the inputted temperature is ordinary temperature (below 60° C.), the ordinary temperature map M31 stated above is selected with reference to FIG. 15 (in a step S316). If the inputted temperature is equal to or higher than the ordinary temperature (60° C.), the high temperature map M32 is selected (in a step S318). In this example, it is assumed that a trans temperature of 55° C. is detected and the ordinary temperature map M31 is selected accordingly.

Thereafter, the secondary side control circuit 38 detects a battery temperature (in a step S320). It is determined whether or not the battery temperature exceeds a preset absolute temperature To (safe temperature) (in a step S322). If the battery temperature exceeds the preset absolute temperature To ('Yes' in the step S322), battery charge is completed instantly (in a step S370 in FIG. 18). That is, if temperature rises abnormally, it is determined that battery charge is completed. Thus, battery charge is stopped instantly in the event that the battery becomes abnormal.

On the other hand, if the battery temperature does not exceed the absolute temperature To ('No' in the step S322), a change in battery temperature dT/dt is detected (calculated) from the difference between the current temperature and the previously detected temperature (in a step S324). It is then determined whether the change in battery temperature dT/dt exceeds a preset change in battery temperature dTc/dt (in a step S326). If the battery temperature exceeds the preset change in battery temperature dTc/dt ('Yes' in the step S326), battery charge is completed instantly (in a step S370). That is temperature rise is quite large, if the battery which life expires is to be charged. Due to this, if temperature rise is quite large, it is determined that the battery charge is completed (incapable of being charged), thereby stopping charging the battery instantly without continuing charge for a long time.

If the change in battery temperature dT/dt does not exceed the preset change in battery temperature dTc/dt ('No' in the step S326), the type of the installed battery pack is determined (in a step S328). Here, if the battery pack 50A for a nickel metal hydride battery is detected, the ordinary temperature map M31 corresponding to the nickel metal hydride battery stated above with reference to FIG. 15 is retrieved (in a step S330). If the battery pack 50B for a nickel cadmium battery is detected, the detected change in battery temperature dT/dt is corrected or, in this case, increased up to 110% (in a step S332) and the map M31 corresponding to the nickel metal hydride battery stated above is retrieved (in a step S330). The reason for correcting the input is as follows. Since the nickel cadmium battery generates higher heat than the nickel metal hydride battery and can carry relatively high current, the input value is increased so as to be able to set a high current value using the maps for a nickel metal hydride battery.

Then, to determine the completion of battery charge, it is determined whether the battery temperature and the change in battery temperature enter the final charging period regions. If they do not belong to regions indicating the battery final period ('Out' in steps S334, S338 and S340), the counter value which is the integral value for determining the completion of battery charge is reset at 0 (in a step S346). On the other hand, if the battery temperature and the change in battery temperature enter regions I42, I43, I34, I35 and I36, which tend to occur in the initial period of the completion of battery charge (final charging period regions (1)) ('In' in the step S334), then "1" is added to the counter (in a step S336). If they enter regions I51, I52, I53, I44, I45, I46, I54, I55 and I56 which tend to occur in the medium period of the completion of battery charge (final charging period regions (2)) ('In' in the step S338), then "2" is added to the counter (in a step S342). Further, if they enter regions I61, I62, I63, I64, I65 and I66, which tend to occur in the final period of the completion of battery charge (final charging period regions (3)) ('In' in the step 340), then '3' is added to the counter (in a step S344). Then, it is determined whether the sum of the counter value exceeds a preset value (such as 10) (in a step S348). If they continuously enter the above-stated final charging period regions and the counter value exceeds the preset value ('High' in a step S348), the completion of battery charge thereby is determined to instantly stop carrying current (in a step S370).

Figure 18:
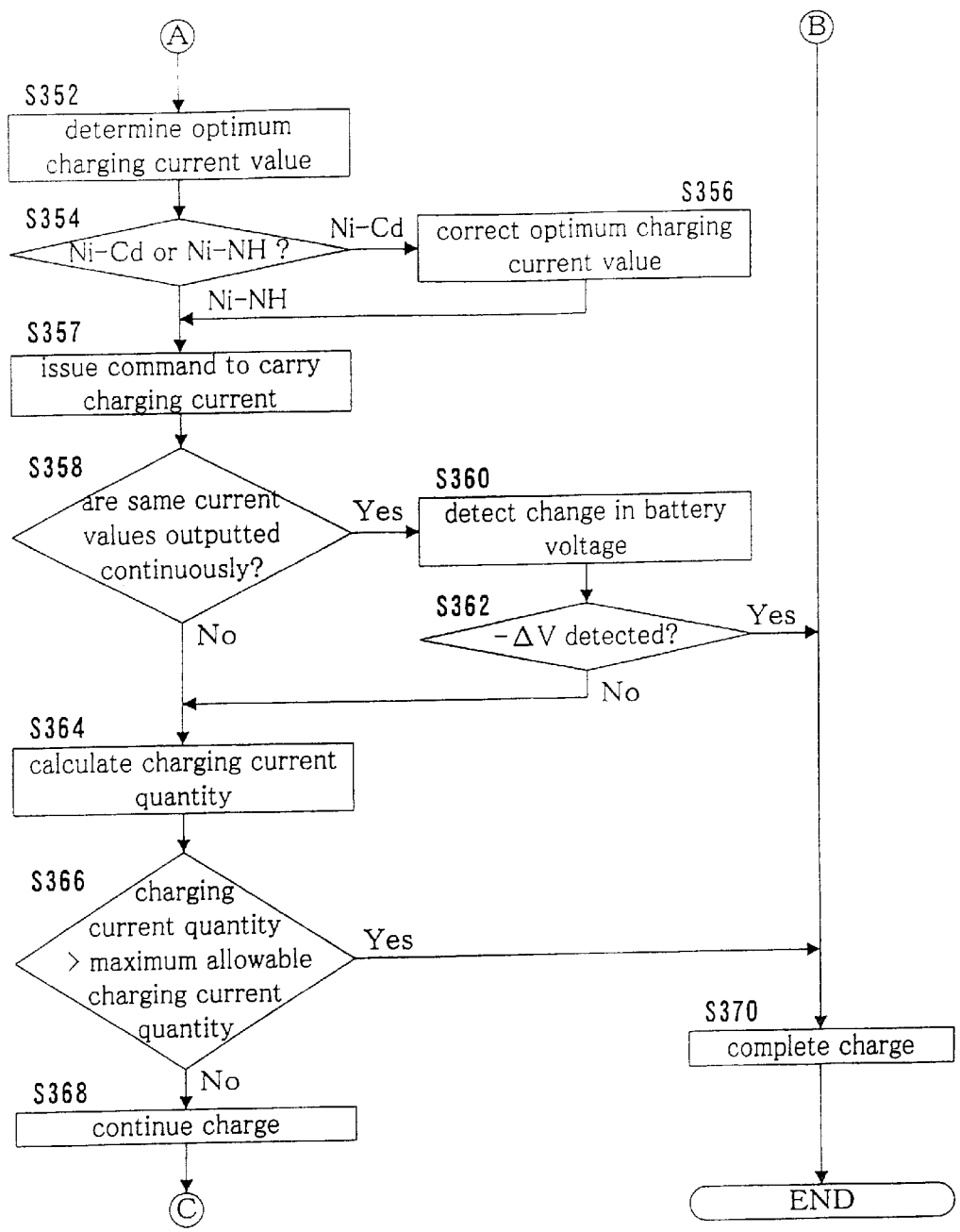
FIG. 18 is a flow chart showing the second half of processing by the charging circuit in the fourth embodiment.

In the meantime, if the counter value does not exceed the preset value ('Low' in a step S348), the value for which the map is retrieved in the above-stated step S330 is determined as a charging current value so as to continue battery charge (in a step S352 shown in FIG. 18). It is then determined whether the installed battery is a nickel metal hydride battery or a nickel cadmium battery (in a step S354). If a nickel metal hydride battery is installed ('Ni—NH' in the step S354), then the secondary side control circuit 38 outputs the current value determined in the step S352 to the primary side control circuit 38 (in a step S357). If a nickel cadmium battery is installed ('Ni—Cd' in the step S354), then the current value determined in the step S352 is corrected (i.e., increased to 110%) (in a step S356) and the corrected current value is outputted to the primary side control circuit 38 (in a step S357). The reason for correcting the output is as follows. Since the nickel cadmium battery generates lower heat than the nickel metal hydride battery and relatively high current can flow, the output is increased so as to be able to set a high current value using the nickel metal hydride battery maps.

Thereafter, to determine the completion of battery charge based on the decrease in battery voltage, it is determined whether the same current values are continuously outputted (in a step S358). This is because appropriate determination cannot be made so as to determine the completion of battery charge based on voltage if charging current is changed (e.g., current is lowered from 10A to 5A). If current is changed ('No' in the step S358), process goes to a step 364. If same current values are outputted continuously ('Yes' in the step S358), a change in battery voltage is detected (in a step S360) and it is determined whether the change in battery voltage is larger than the voltage drop (−ΔV) which occurs at the time of completion of battery charge) (in a step S362). If the change in battery voltage is larger than the voltage drop ('Yes' in the step S362), battery charge is stopped (in a step S370). If the change is smaller ('No' in the step S362), process goes to a step S364.

The battery charger in this embodiment determines the completion of battery charge based on battery voltage in the steps S358 to S362. The reason is as follows. If environmental temperature is low, the battery is cooled and the detection of a battery temperature rise value might therefore become difficult. Also, a battery which has been stocked for a long time exhibits a temperature change pattern different from an ordinary battery. Due to this, if a voltage drop which is equal to or more than a predetermined value is detected, it is determined that battery charge is completed to thereby stop battery charge, without continuing charging the battery for a long time.

Figure 19:
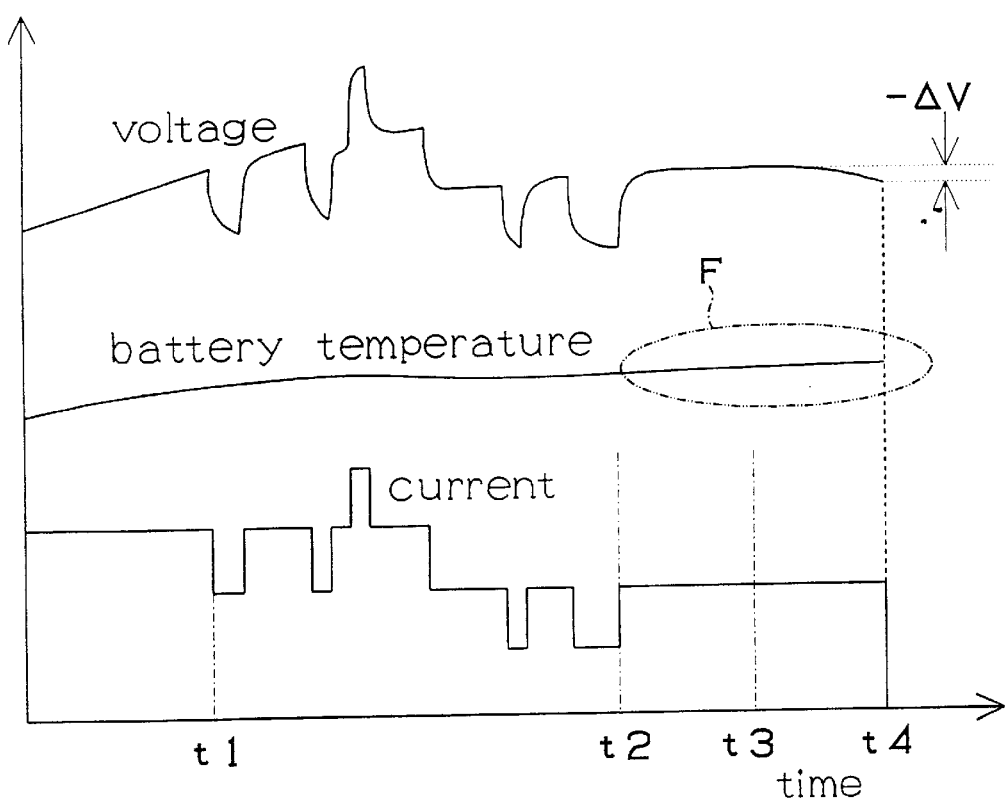
FIG. 19 is a waveform graph showing changes in battery voltage, battery temperature and current in the battery charger in the fourth embodiment.

The relationship between the change in temperature and voltage while the environmental temperature is low will be described in more detail with reference to FIG. 19. In FIG. 19, the horizontal axis indicates time and the vertical axis indicates changes in voltage, battery temperature and charging temperature. Here, charging current is changing from times t1 to t2 ('No' in the step S358), so that completion of charge is not determined. After the time t2, current is not changed. Therefore, determination as to the completion of battery charge is started from a time t3 ('Yes' in the step S358). As described above, if environmental temperature is low and the difference between the battery temperature and the environmental temperature is large, the battery is cooled and it becomes difficult to detect a temperature rise in a region indicated by a reference symbol F in FIG. 18. Owing to this, if the voltage drop (−ΔV) is detected at a time t4, even in these circumstances, it is determined that battery charge is completed, thereby preventing occurrence of overcharge.

Referring to FIG. 18, the processing by the secondary side control circuit 38 will be described continuously. In a step S364, charging current integrates by charging time to thereby calculate the quantity of charging current(in a step S364). It is then determined whether the quantity of charging current exceeds the maximum allowable charging current quantity (in a step S366). If the charging current quantity exceeds the maximum allowable charging current quantity ('Yes' in the step S366), battery charge is instantly completed (in a step S370). If it does not exceed the maximum allowable charging current quantity ('No' in the step S366), battery charge is continued (in a step S368). Here, the battery charger in the fourth embodiment may not be able to accurately detect completion of battery charge based on the map for various reasons; however, the battery charger certainly stops battery charge by determining that battery charge is completed if the integral value exceeds a predetermined value.

Figure 20:
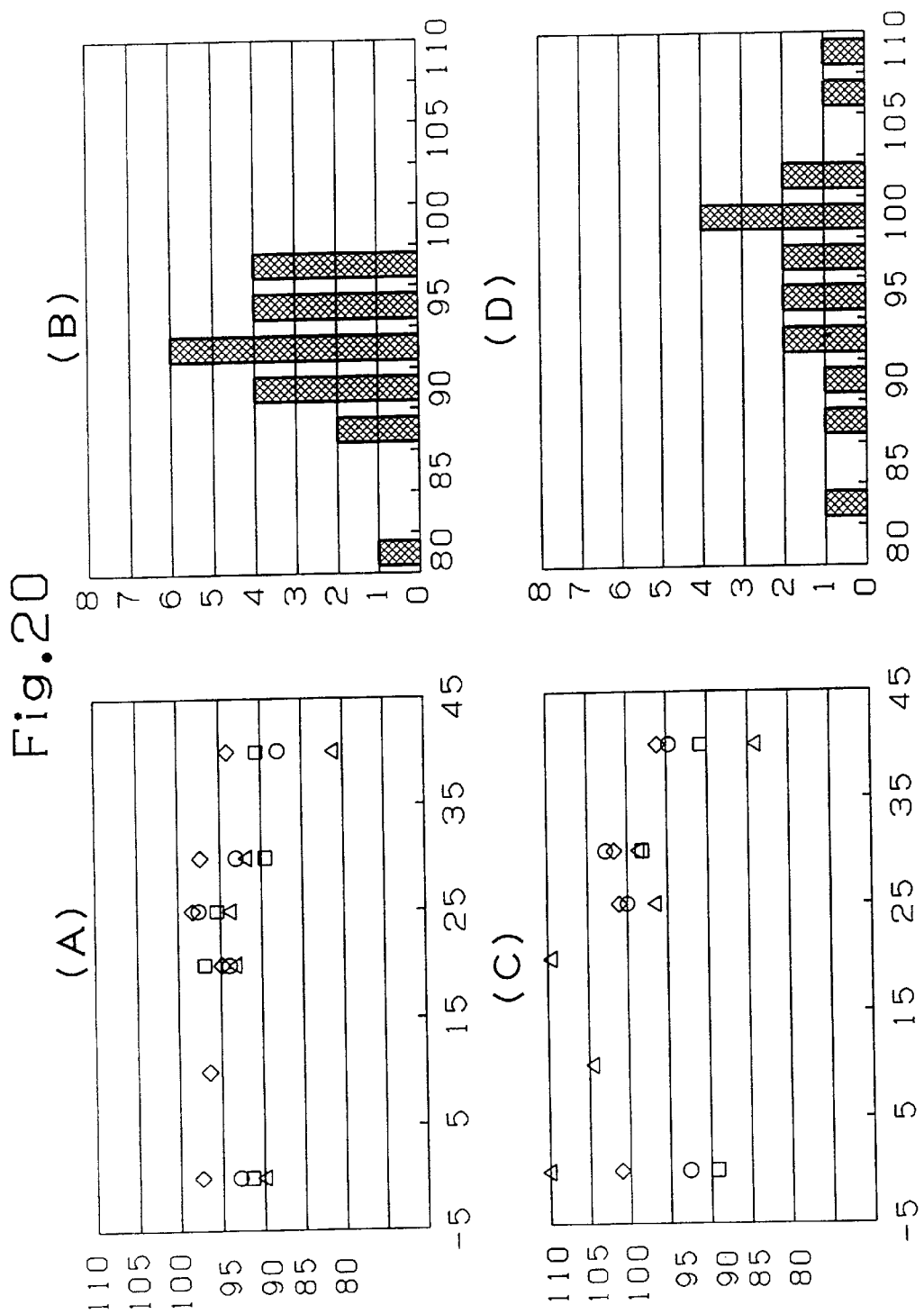
FIGS. 20(A) and 20(B) are graphs showing the results of a charging test of the battery charger in the fourth embodiment.
FIGS. 20(C) and 20(D) are graphs showing the results of a charging test of the battery charger in the first embodiment.

As stated above, since the battery charger in the fourth embodiment determines the completion of battery charge based on a weighted map, it can charge a battery to target capacity more accurately, which will be described with reference to FIG. 20 showing the results of comparing the determination as to completion of charge by the battery charger (without a weight) in the first embodiment, with that by the battery charge (with a weight) in the fourth embodiment.

In FIG. 20, (A) and (B) show the battery pack for which determination as to completion of charge is made by the battery charger (with a weight) in the fourth embodiment, whereas (C) and (D) show the battery pack for which determination as to completion of charge is made by the battery charge (without a weight) in the first embodiment. In (A), the horizontal axis indicates the temperature of the battery pack (−5° C. to 45° C.) at the start of battery charge and the vertical axis indicates percentage of charging capacity to a target charging capacity (such as 3 AH). In the test (with a weight) shown in (A), 21 battery packs were tested. In the test (without a weight) shown in (C), 17 various battery packs were tested. (B) is a bar graph showing the result of (A) and (D) is a bar graph showing the result of (C). In (B) and (D), the horizontal axis indicate percentage of charging capacity to a target charging capacity and the vertical axis indicates the number of battery packs. As can be seen from (B), if a weight is given, the battery can be charged to 90 to 95% capacity without overcharge. As can be seen from (D), if a weight is not given, some of the batteries were charged to 100% or more and the quantities of charging current were not uniform.

The battery charger in the fourth embodiment adds a high count value if temperature rise is large and the rise remains large even if a charging current value is lowered, and adds a low count value if a temperature rise value does not increase by lowering a charging current value, even if temperature rise is large. Due to this, it is possible to charge batteries to 100% without overcharge and without influences of the residual battery capacity, temperature and the like. In particular, depending on the settings of a map, it is possible to freely detect a capacity value which is set at not only 100% but also at 85%±5% and 95%±5%.

The battery charger in the fourth embodiment employs maps in which allowable current values with which a nickel metal hydride battery can be charged with temperature rise suppressed, which are mapped based on the temperature values and temperature rise values of the battery. As for the nickel metal hydride battery, one of the maps is retrieved, an allowable temperature rise value is obtained and the battery is charged. As for a nickel cadmium battery, a temperature rise value (or the temperature of the battery) is corrected, one of the maps for a nickel metal hydride battery is retrieved to obtain an allowable current value and the obtained allowable current value is corrected to thereby charge the battery. Due to this, it is possible to charge both a nickel metal hydride battery and a nickel cadmium battery in a short time by using a single map without causing deterioration due to temperature rise.

The completion of battery charge is, in particular, determined based on the map. As for a nickel metal hydride battery, the map is directly retrieved. As for a nickel cadmium battery, a battery temperature rise value is corrected, one of the maps for a nickel metal hydride battery is retrieved and the completion of battery charge is determined. Thus, it is possible to charge both a nickel metal hydride battery and a nickel cadmium battery to 100% capacity without causing overcharge and without influences of the residual battery capacities, temperatures and the like by using a single map.

In the battery charger in the embodiment stated above, maps for a nickel metal hydride battery which temperature tends to increase during charge and tends to be easily deteriorated by temperature rise are set, and optimum charging current control can therefore be conducted to the nickel metal hydride battery. It is possible to prepare maps for a nickel cadmium battery so as to use the map therefore. In the latter case, as for a nickel metal hydride battery, a detected temperature value is corrected (i.e., an input value at the time of retrieving the map is lowered to about 90%) and the output current value obtained by retrieving the map is corrected (i.e., the current value is lowered to about 90%). In the latter case, by setting maps for a nickel cadmium battery which temperature rise occurs less during charge, optimum charging current control is conducted to the nickel cadmium battery. In the battery charger in this embodiment, one map deals with batteries of two different characteristics. It is also possible that a single map deals with three or more types of batteries.

A battery charger in the fifth embodiment according to the present invention will be described next with reference to FIGS. 21 to 24. In the battery charger in the first embodiment stated above, a plurality of maps are prepared in accordance with types of batteries and battery voltages. In the battery charger in this embodiment, a map M41 for ordinary charging mode and a map M42 for quick charging mode as shown in FIG. 22 are prepared.

Figure 21:
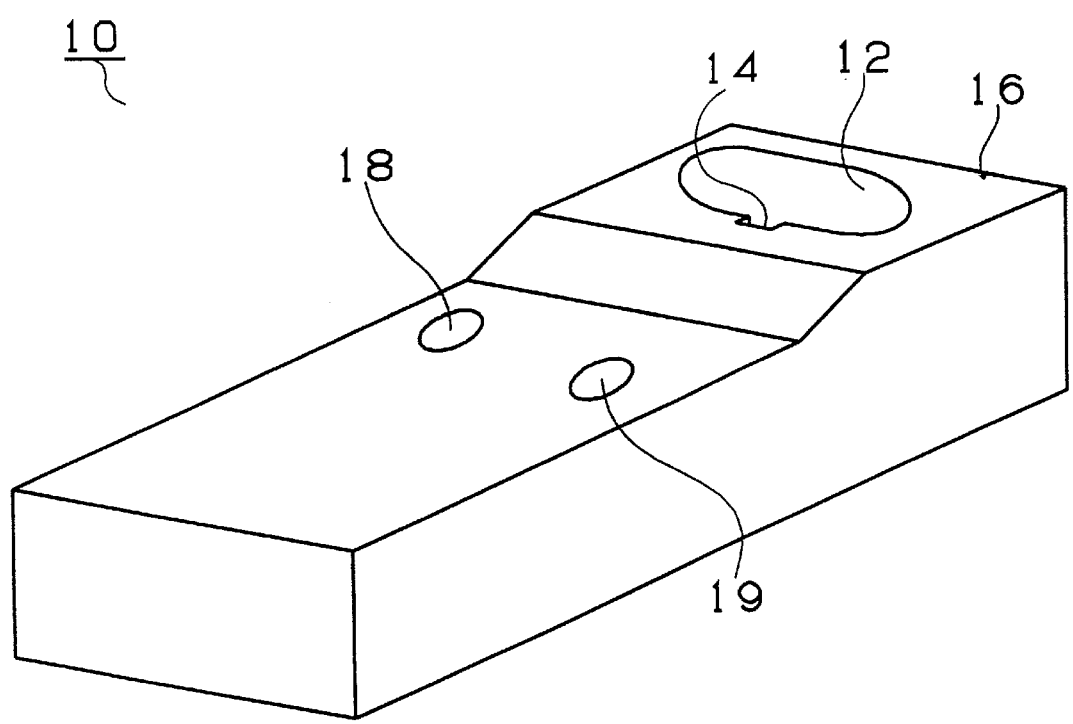
FIG. 21 is a perspective view of a battery charger in the fifth embodiment according to the present invention.

FIG. 21 shows the outline of the battery charger in the fifth embodiment. The battery charger is almost the same as that in the first embodiment described above with reference to FIG. 1 except that a switch-over switch 19 for switch-over of the charging map is provided in the battery charger in the fifth embodiment.

Figure 23:
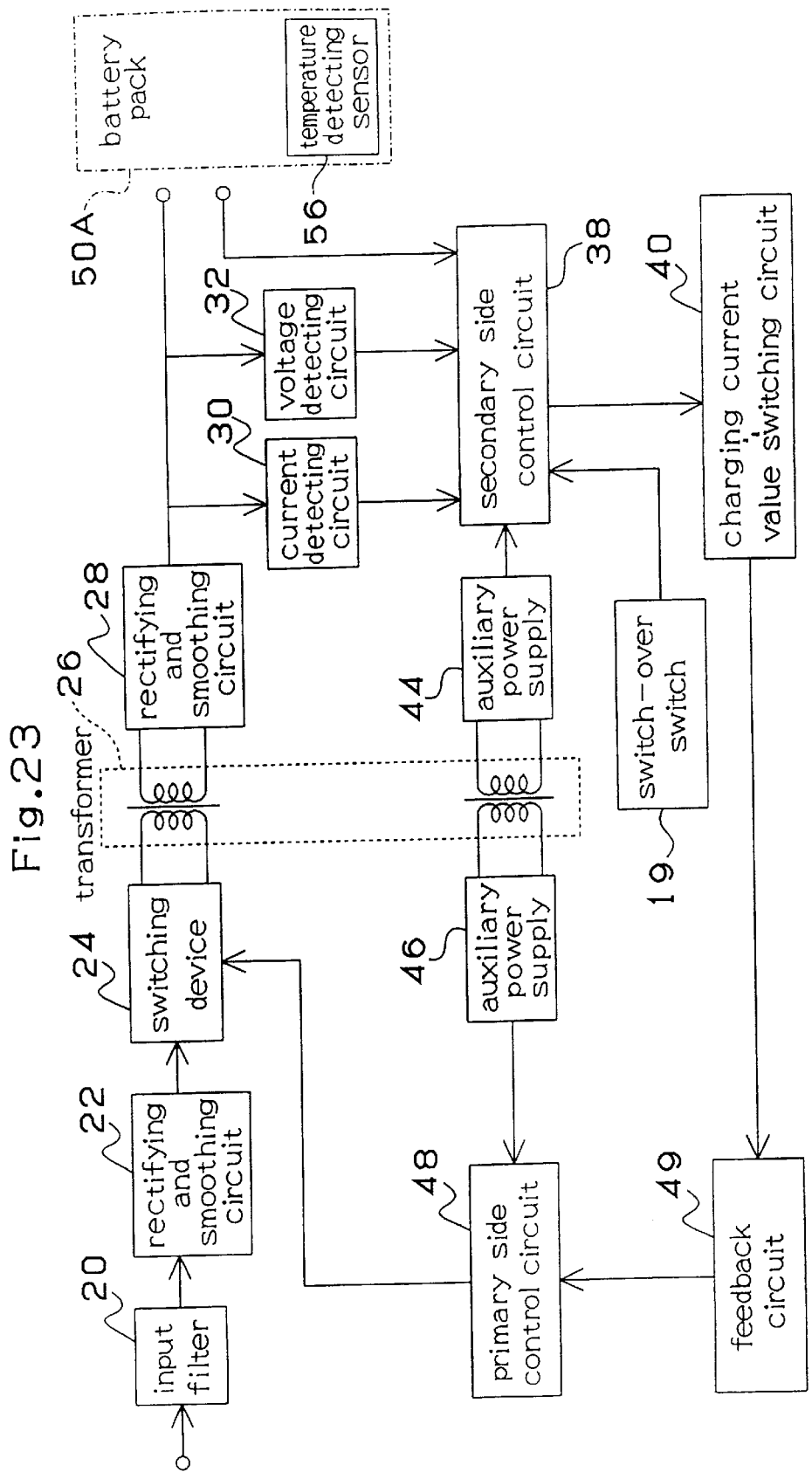
FIG. 23 is a block diagram showing the charging circuit in the battery charger shown in FIG. 21.

FIG. 23 shows the circuit arrangement of the battery charger in the fifth embodiment. The battery charger is almost the same as that in the first embodiment described above with reference to FIG. 4, except that the battery charger in this embodiment is configured such that a secondary side control circuit 38 switches one charging map to another in accordance with switch-over of the switch-over switch 19.

In the battery charger in the fifth embodiment, the normal mode map M41 is normally selected. Now, if a normal mode is selected, a battery is charged while avoiding temperature rise so as to elongate the battery life, and battery charge is stopped when the battery is charged to 90% capacity. This is because the pressure inside the battery increases and the battery life is shortened if the battery is charged close to 100%. On the other hand, if an operator depresses the switch-over switch 19, the quick charging mode map M52 is selected. In this case, a battery is quickly charged while avoiding temperature rise, and battery charge is stopped when the battery is charged up to 100% capacity.

Figure 24:
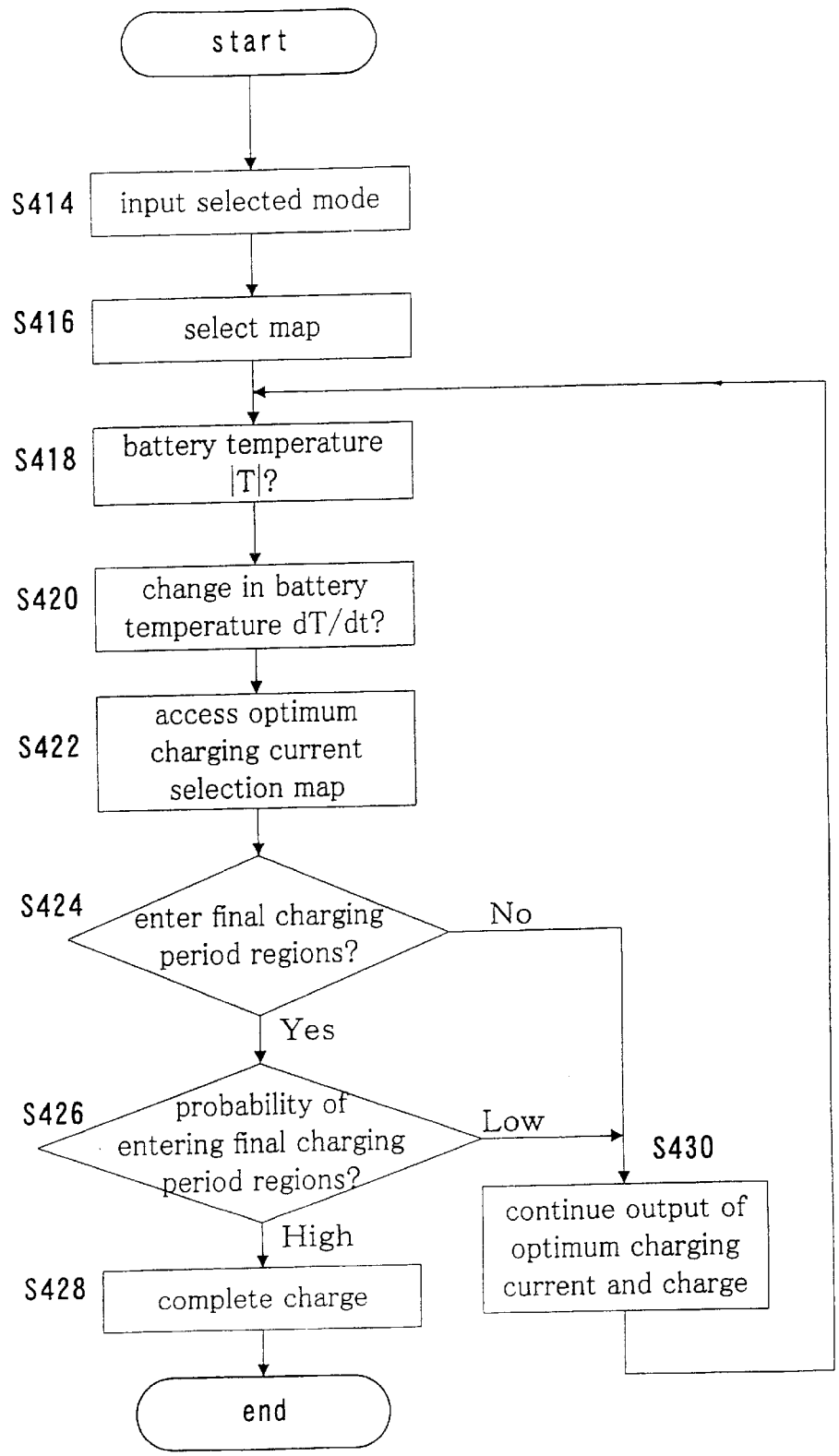
FIG. 24 is a flow chart showing processing by the charging circuit in the fifth embodiment.

Description will now be given to processing by the secondary side control circuit 38 in the battery charger in the fifth embodiment with reference to FIG. 24.

When battery charge starts, the secondary side control circuit 38 (see FIG. 13) in the battery charger adjusts charging current and determines the completion of charge in predetermined cycles. First, a selected mode is inputted (in a step S414) and a map corresponding to the inputted mode is selected (in a step S416). In this example, it is assumed that the quick charging mode map M42 shown in FIG. 22 is selected. Thereafter, a battery is charged based on the map M42 (in steps S418 to 430). Processing in the steps S418 to 430 is the same as those in the steps S18 to S30 in the first embodiment described above with reference to FIG. 7, which description will not therefore be given herein.

In the battery charger in the fifth embodiment, if the quick charging mode map M42, in which a high target charging capacity is set, is selected, it is possible to charge a nickel metal hydride battery which temperature tends to rise during charge in a short time to the extent that the battery does not deteriorate due to temperature rise. On the other hand, if the normal mode map, in which a low target charging capacity is set, is selected, battery charge is stopped before a battery is fully charged, whereby the life of the nickel metal hydride battery which tends to be affected by overcharge can be elongated, and the battery can repeatedly be used for a long time.

Now, description will be given to a battery charger in the sixth embodiment according to the present invention with reference to FIGS. 25 to 29. The battery chargers in the first to fifth embodiments described above charge batteries to a target capacity using maps. In the battery charger in the sixth embodiment by contrast, after battery charge is completed by the battery charger in one of the first to fifth embodiments, auxiliary charge or trickle charge is conducted by slightly carrying current using a map.

In the battery charger according to the conventional technique, pulsed current is applied when auxiliary or trickle charge is conducted. That is, even if low current is continuously carried, a battery which has reached high capacity level cannot efficiently be charged. Due to this, by carrying pulse current, i.e., momentarily carrying high current, auxiliary or trickle charge is conducted with equivalent average low current. In the conventional battery charger, a pulse cycle for auxiliary charge is set to be constant. The battery charger in the sixth embodiment, by contrast, detects battery temperature and a change in battery temperature by changing a pulse cycle while changing the quantity of pulse current to be applied, thereby carrying constant and average current.

In case of conducting auxiliary charge or trickle charge while charging current is kept constant, decrease in battery temperature is small by making the pulse cycle short. Conversely, decrease in temperature is large if the pulse cycle is made longer. In other words, it is possible to determine that battery temperature can be decreased by making the pulse cycle longer. If the pulse cycle is made longer, a quiescent period in which the battery is not charged becomes longer and self-discharge is continuously conducted in the quiescent period. As a result, the battery capacity is lowered at the end of the quiescent period, i.e., just before the next pulse charge. If the battery pack is detached during this timing, the capacity becomes relatively low and the purpose of the auxiliary or trickle charge cannot be sufficiently attained.

Owing to this, the battery charger in the sixth embodiment determines the state of the battery based on the absolute temperature of the battery and the temperature decrease value, and charges the battery in cycles in which current can be carried while decreasing the battery temperature, that is, by changing the pulse cycle in accordance with the state of the battery.

Figure 27:
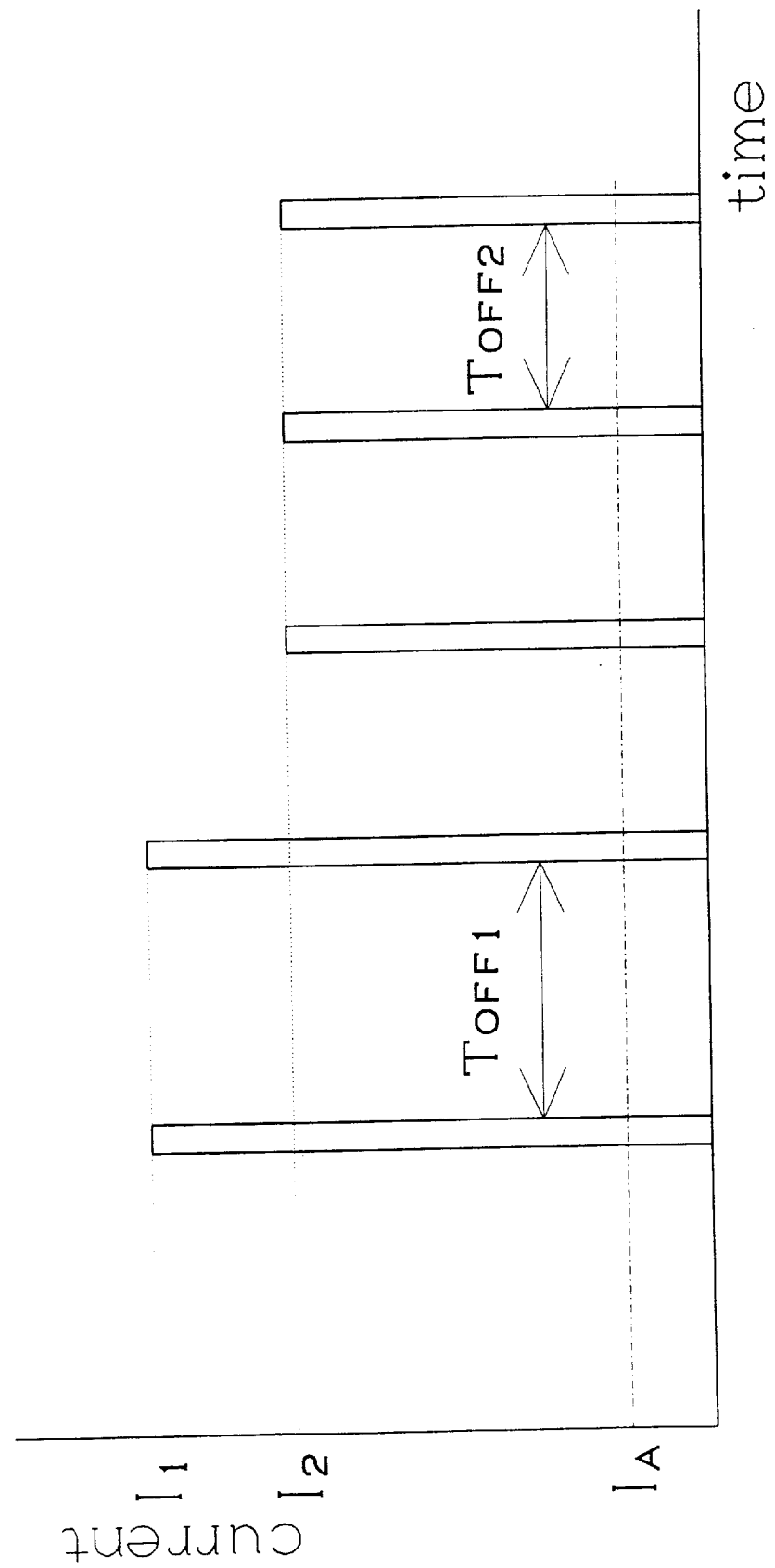
FIG. 27 is a waveform timechart showing the magnitude and cycle of charging current in the battery charger in the sixth embodiment.

In this example, the pulse cycle is changed while keeping average charging current constant. In other words, as shown in FIG. 27, an average of current IA of about 0.1 C is carried in auxiliary charge and an average of current IA of about 0.02 C is carried in trickle charge. When battery temperature is high, relatively high pulse charging current I1 is carried in a long cycle of TOFF1. When battery temperature is low, relatively low pulse charging current I2 is carried in a short cycle TOFF2. If temperature decrease is small, relatively high pulse charging current is carried in a long cycle. If temperature decrease is large, relatively low pulse charging current is carried in a short cycle.

A map M51 shown in FIG. 25 is provided to conduct variable-control of current. In the map M51, the horizontal axis indicates the absolute temperature T of a battery and the vertical axis indicates change in temperature dT/dt. An optimum pulse cycle in which current can be carried while decreasing temperature is specified. That is, if battery temperature is high and temperature decrease is small (lower right in the map), then relatively long cycle pulse current is carried. If battery temperature is high and temperature decrease is large (upper right in the map), then medium cycle pulse charging current is carried. If battery temperature is low and temperature decrease is small (lower left in the map), then medium cycle pulse charging current is carried. If battery temperature is low and temperature decrease is large (upper left in the map), then relatively short cycle pulse charging current is carried.

Figure 26:
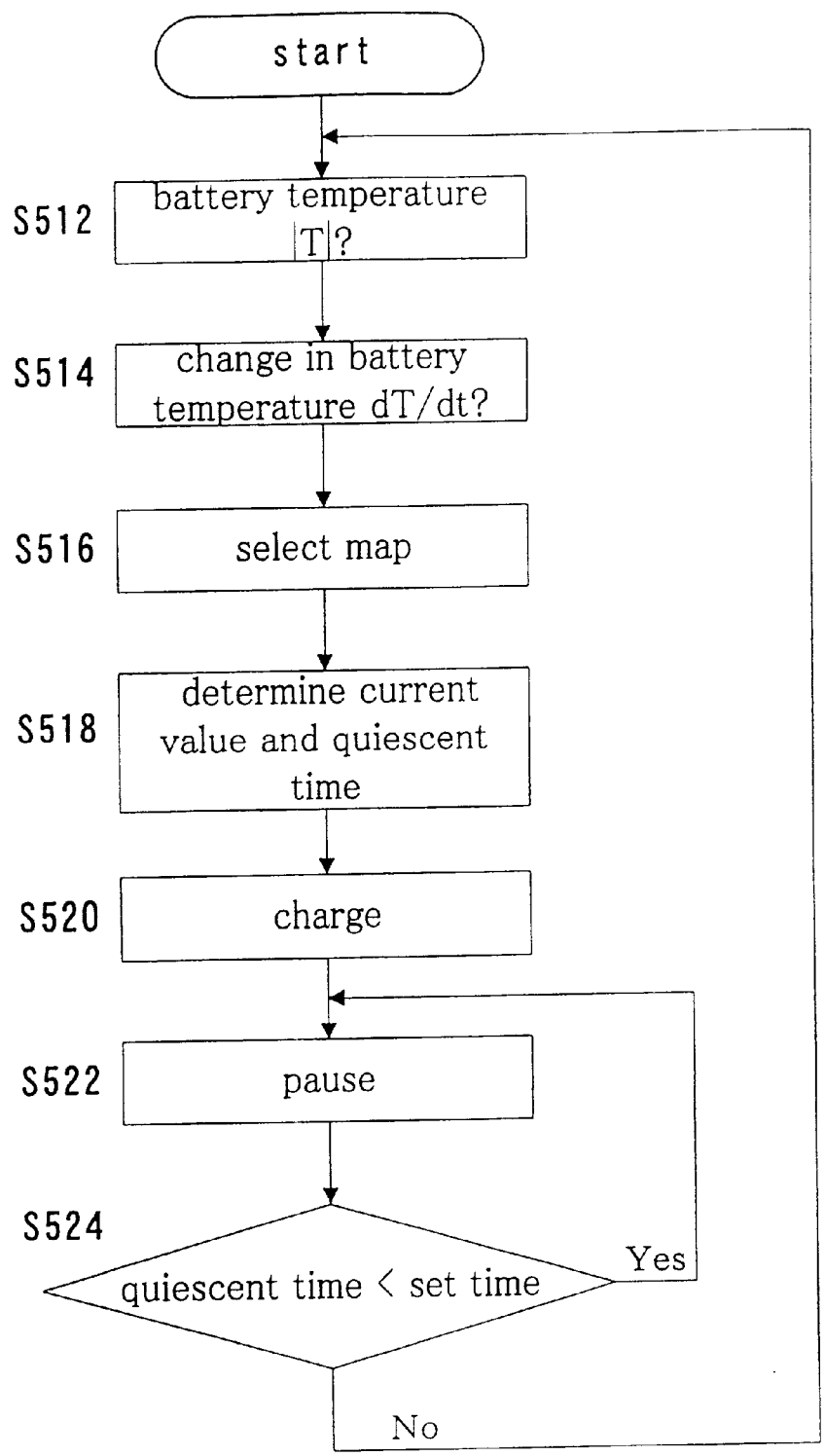
FIG. 26 is a flow chart showing processing by the charging circuit in the sixth embodiment.

Description will now be given to processing by a secondary control circuit 38 in the battery charger in the sixth embodiment with reference to FIG. 26.

When battery charge starts, the secondary side control circuit 38 (see FIG. 23) in the battery charger adjusts charging current and determines the completion of battery charge. First, the absolute temperature T of a battery is inputted (in a step S512). Next, the inputted absolute temperature T is differentiated and a change in battery temperature dT/dt is calculated (in a step S514). Then, the map M51 described above with reference to FIG. 25 is retrieved (in a step S516) and a current value (the peak value of pulse current) and a quiescent time (pulse cycle) are determined (in a step S518). The circuit 38 carries current of the determined value (in a step S520) and pauses by the determined pulse cycle (in a step S522). If the quiescent time exceeds a set time ('No' in a step S524), process returns to the step 512 and battery charge is continued.

The result of a test which compared auxiliary charge (0.1 C) by the battery charger in the sixth embodiment to auxiliary charge (0.1 C) by the conventional battery charger will be described with reference to the graph of FIG. 28.

Figure 28:
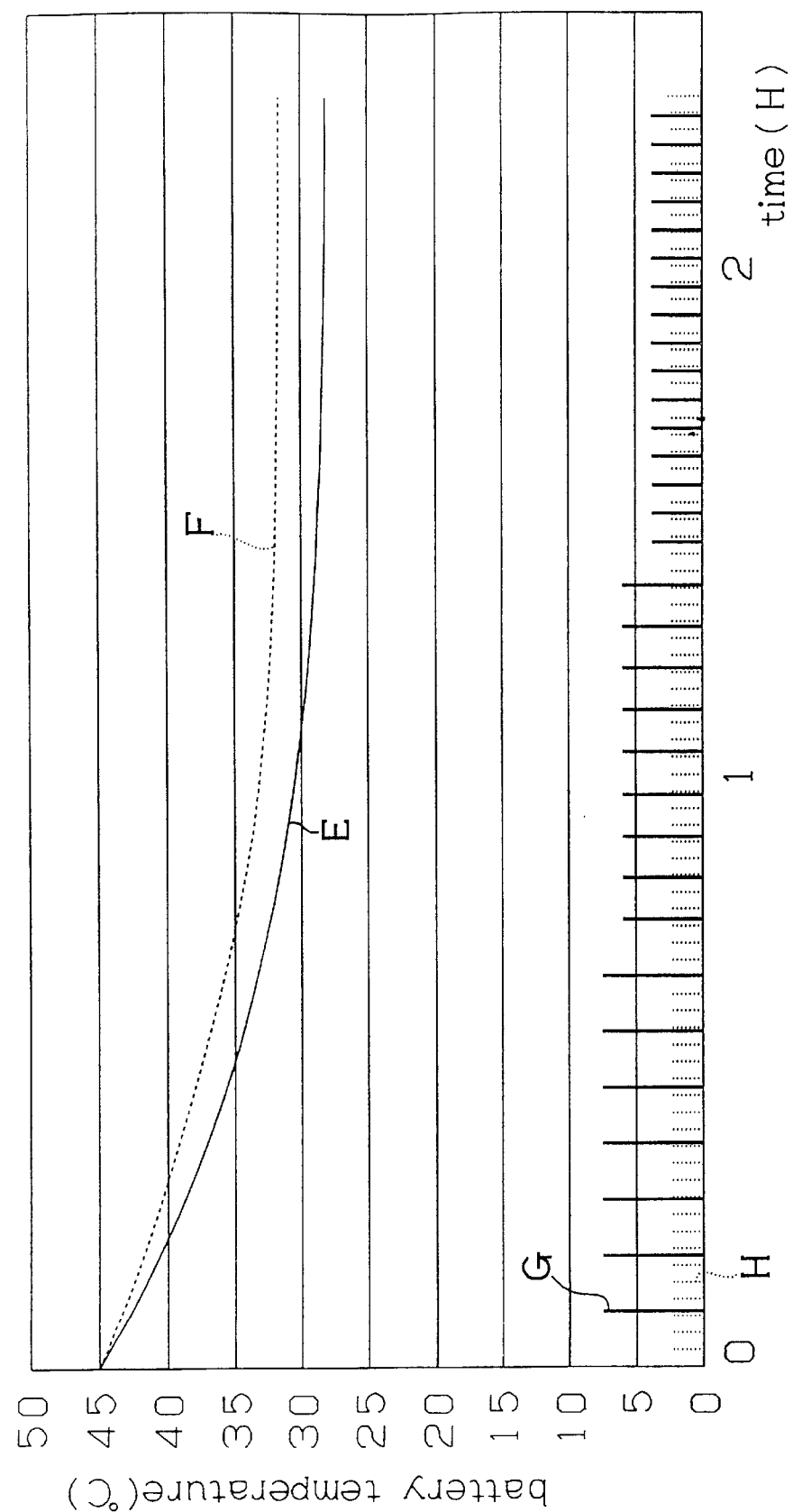
FIG. 28 is a graph showing auxiliary charge of the battery charger in the sixth embodiment.

In FIG. 28, the horizontal axis indicates time and the vertical axis indicates battery temperature and charging current. As indicated by a reference symbol G in FIG. 28, the battery charger in this embodiment changes the charging current cycle in accordance with battery temperature (average current of 0.1 C). The battery charger according to the conventional technique, by contrast, applies pulse current in constant cycle as indicated by a broken line H (average current of 0.1 C). The battery charger in this embodiment efficiently decreases battery temperature as indicated by a solid line E in FIG. 28, whereas battery temperature is difficult to decrease in the battery charger according to the conventional technique as indicated by a broken line F in FIG. 28.

The battery charger in the sixth embodiment employs a map in which current values are mapped based on the temperatures and temperature decrease values of a battery, and controls the pulse current value and pulse cycle so as to be able to conduct auxiliary charge while decreasing the temperature of the battery. That is, if battery temperature is high and temperature decrease is small, the battery is efficiently charged by increasing an allowable current value, making the pulse cycle longer and quickly decreasing battery temperature. On the other hand, if battery temperature is low or temperature decrease is large, the battery is constantly maintained in a state of 100% charge by decreasing the allowable current value and making the pulse cycle shorter. In other words, if the pulse cycle is made longer, a quiescent time in which the battery is not charged becomes long and self discharge is continuously conducted during the quiescent time. Then, the battery capacity is decreased at the end of the quiescent time, i.e., just before the next pulse charge. If the battery pack is detached during this timing, the battery capacity is relatively lowered. In this embodiment, the pulse cycle is made short and the quantity of self discharge in the quiescent time is therefore decreased, whereby it is possible to constantly maintain the battery to high capacity.

The battery charger in the sixth embodiment can also be applied, not only to trickle charge and auxiliary charge but also to a stand-by state in which the battery is not charged until battery temperature decreases to an allowable temperature, if charging the battery which temperature rises after being used.

Figure 29:
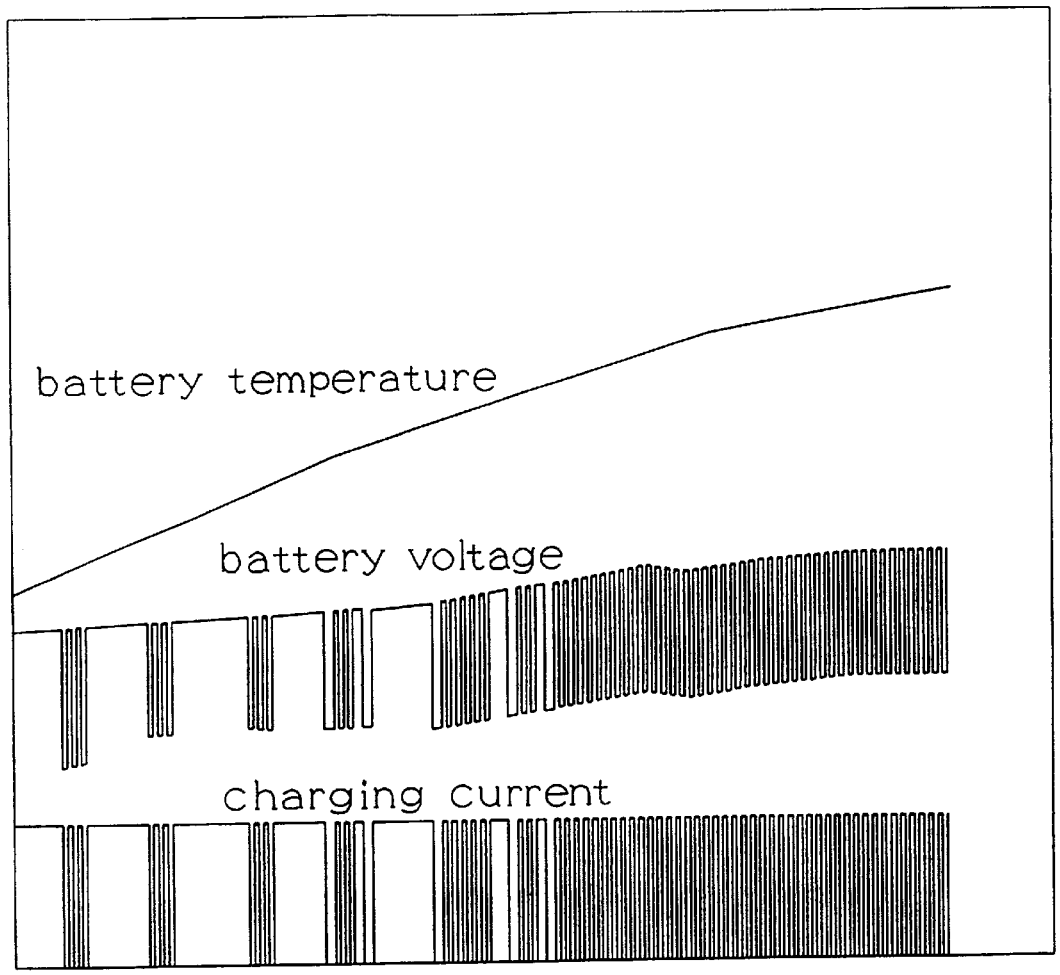
FIG. 29 is a graph showing battery temperature, battery voltage and charging current during battery charge of a battery charger in the seventh embodiment according to the present invention.

FIG. 29 is a graph showing battery temperature, battery voltage and charging current while a battery is being charged by a battery charger in the seventh embodiment according to the present invention. As stated above, the battery chargers in the first to fifth embodiments adjust charging current by switching one current value to another in stages. The battery charger in the seventh embodiment, by contrast, adjusts charging current by switching the duty ratio of the charging current. Specifically, the battery chargers in the first to fifth embodiments switch the current value to 4 C (e.g., 8 A) –3 C (6 A)–2 C (4 A)–1 C (2 A). The battery charger in the seventh embodiment contains the 4C capacity of current and adjusts current by carrying current incessantly in case of 4 C, carrying current in 75% of one cycle and stopping current in 25% thereof in case of 3C, carrying current in 50% of one cycle and stopping current in 50% thereof in case of 2C, and carrying current in 25% of one cycle and stopping current in 75% of one cycle in case of 1 C. Since the battery charger in the seventh embodiment adjusts the quantity of current by the duty ratio, it has an advantage in that current adjustment can be made with simple and economical constitution.

The battery chargers in the first to seventh embodiments have been described as different modes. However, it goes without saying that they can be appropriately combined.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

I claim:

1. A battery charger comprising;
   a storage device storing at least two types of maps, in which an allowable current value, with which a battery can be charged while a temperature rise of the battery is being suppressed, is mapped based on a battery temperature value and a battery temperature rise value, in accordance with a temperature of the battery charger;
   temperature detecting means for detecting a current battery temperature;
   temperature rise value outputting means for obtaining the temperature rise value from the temperature detected by said temperature detecting means;
   battery charger temperature detecting means for detecting the temperature of said battery charger;
   allowable current value retrieving means for retrieving a map corresponding to the battery charger temperature, from the battery charger temperature detected by said battery charger temperature detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

2. The battery charger according to claim 1, wherein the map used when the battery charger temperature is high and corresponding to said battery charger temperature, is set so as not to carry high charging current.

3. A battery charger comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

first charge completion determining means for determining completion of battery charge based on whether frequency, with which the temperature detected is high by said temperature detecting means and the temperature rise value outputted from said temperature rise value outputting means belong to a region indicating a final charging period in the map of said storage device;

second charge completion determining means for determining completion of battery charge if the temperature rise value outputted from said temperature rise value outputting means exceeds a preset temperature rise value; and charge completing means for completing the battery charge based on determinations as the completion of the battery charge by said first charge completion determining means and said second charge completion determining means.

4. A battery charger comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current value retrieving means;

first charge completion determining means for determining completion of battery charge based on whether frequency is high with which the temperature detected by said temperature detecting means and the temperature rise value outputted from said temperature rise value outputting means belong to a region indicating a final charging period in the map of said storage device;

second charge completion determining means for determining completion of battery charge if the temperature value outputted from said temperature detecting means exceeds a preset temperature value; and charge completing means for completing the battery charge based on determinations by said first charge completion determining means and said second charge completion determining means.

5. A battery charger comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

voltage detecting means for detecting battery voltage;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

first charge completion determining means for determining completion of battery charge based on whether frequency, with which the temperature detected by said temperature detecting means and the temperature rise value outputted from said temperature rise value outputting means belong to a region indicating a final charging period in the map of said storage device, is high;

second charge completion determining means for determining completion of battery charge if a decrease value of the battery voltage outputted from said voltage detecting means exceeds a preset decrease value; and charge completing means for completing the battery charge based on determinations by said first charge completion determining means and by said second charge completion determining means.

6. A battery charger comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

first charge completion determining means for determining completion of battery charge based on whether frequency, with which the temperature detected by said temperature detecting means and the temperature rise value outputted from said temperature rise value outputting means belong to a region indicating a final charging period in the map of said storage device, is high;

second charge completion determining means for integrating charging current quantity for said battery and for determining completion of battery charge if an integral value exceeds a preset integral value; and charge completing means for completing the battery charge based on determinations by said first charge completion determining means and by said second charge completion determining means.

7. A battery charger comprising;

a storage device storing a map in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high;

temperature detecting means for detecting a current battery temperature;

temperature rise value outputting means for obtaining the temperature rise value from the temperature detected by said temperature detecting means;

allowable current value retrieving means for retrieving the map of said storage device from the temperature detected by said temperature detecting means and the temperature rise value outputted from said temperature rise value outputting means, and for obtaining said allowable current value;

charging means for charging the battery with the allowable current value retrieved by said allowable current retrieving means;

charge completion determining means for determining completion of battery charge based on whether the temperature detected by said temperature detecting means and the temperature rise value outputted from said temperature rise value outputting means belong to a region, which tends to occur in a final charging period in the map of said storage device, for adding a low count value to a count if the temperature detected by said temperature detecting means and the temperature rise value outputted from said temperature rise value outputting means belong to a region, which tends to occur at a start of the final charging period in the map, for adding a high count value to the count if the temperature detected by said temperature detecting means and the temperature rise value outputted from said temperature rise value outputting means belong to a region, which tends to occur at an end of the final charging period in the map, and for determining the completion of the battery charge if a sum of count values exceeds a set value; and charge completing means for completing the battery charge based on determination as the completion of the battery charge by said first charge completion determining means and by said second charge completion determining means.

8. A battery charger capable of charging a battery of a first type and a battery of a second type comprising:

a storage device for storing a map in which an allowable current value, with which the battery of the first type can be charged while a temperature rise of the battery of the first type is being suppressed, is mapped based on a battery temperature and a battery temperature rise value;

temperature detecting means for detecting a current battery temperature;

temperature rise value outputting means for obtaining the temperature rise value from the temperature detected by said temperature detecting means;

battery type detecting means for detecting whether a battery is the first type or the second type;

allowable current value retrieving means for retrieving the map of said storage device from the temperature detected by said temperature detecting means and the temperature rise value outputted from said temperature rise value outputting means, the allowable value retrieving means retrieving said map and obtaining and outputting the allowable current value if the battery of first type is detected by said battery type detecting means, the allowable value retrieving means correcting at least one of the temperature detected by said temperature detecting means and the temperature rise value outputted from said temperature rise value outputting means, retrieving said map, obtaining the allowable current value and correcting and outputting the obtained allowable current value; and charging means for charging the battery with the allowable current value outputted by said allowable current retrieving means.

9. A battery charger capable of charging a battery of a first type and a battery of a second type comprising:

a storage device for storing a map in which an allowable current value, with which the battery of the first type can be charged while a temperature rise of the battery of the first type is being suppressed, is mapped based on a battery temperature and a battery temperature rise value;

temperature detecting means for detecting a current battery temperature;

temperature rise value outputting means for obtaining the temperature rise value from the temperature detected by said temperature detecting means;

battery type detecting means for detecting whether a battery is the first type or the second type;

allowable current value retrieving means for retrieving the map of said storage device from the temperature detected by said temperature detecting means and the temperature rise value outputted from said temperature rise value outputting means, the allowable value retrieving means retrieving said map and obtaining and outputting the allowable current value if the battery of first type is detected by said battery type detecting means, the allowable value retrieving means correcting at least one of the temperature detected by said temperature detecting means and the temperature rise value outputted from said temperature rise value outputting means, retrieving said map, obtaining the allowable current value and correcting and outputting the obtained allowable current value;

charging means for charging the battery with the allowable current value obtained by said allowable current retrieving means;

charge completion determining means for determining completion of battery charge based on whether frequency, with which the temperature detected by said temperature detecting means and the temperature rise value outputted from said temperature rise value outputting means belong to a region indicating a final charging period in the map of said storage means, is high, the charge completion determining means directly retrieving said map if the battery of the first type is detected by said battery type detecting means, the charge completion determining means retrieving said map after correcting at least one of the temperature detected by said temperature detecting means and the temperature rise value outputted from said temperature rise value outputting means; and charge completing means for completing the battery charge based on determination as the completion of the battery charge by said charge completion determining means.

10. The battery charger according to claim 8 wherein said battery of the first type is a nickel metal hydride battery and the battery of the second type is a nickel cadmium battery; and said allowable current value retrieving means obtains the allowable current value by correcting the temperature rise value to a positive side and retrieving said map, corrects the obtained allowable current value to a positive side and outputs the corrected allowable current value.

11. The battery charger according to claim 9, wherein said battery of the first type is a nickel metal hydride battery and the battery of the second type is a nickel cadmium battery; and said allowable current value retrieving means obtains the allowable current value by correcting the temperature rise value to a positive side and retrieving said map, corrects the obtained allowable current value to a positive side and outputs the corrected allowable current value.

12. The battery charger according to claim 8, wherein said battery of the first type is a nickel cadmium battery and the battery of the second type is a nickel metal hydride battery; and said allowable current value retrieving means obtains the allowable current value by correcting the temperature rise value to a negative side and retrieving said map, corrects the obtained allowable current value to a negative side and outputs the corrected allowable current value.

13. The battery charger according to claim 9, wherein said battery of the first type is a nickel cadmium battery and the battery of the second type is a nickel metal hydride battery; and said allowable current value retrieving means obtains the allowable current value by correcting the temperature rise value to a negative side and retrieving said map, corrects the obtained allowable current value to a negative side and outputs the corrected allowable current value.

14. A battery charger capable of charging batteries of different types comprising;

a storage device storing a map, in which an allowable current value, with which a battery can be charged while a temperature rise of the battery is being suppressed, is mapped based on a battery temperature value and a battery temperature rise value, for every battery type;

temperature detecting means for detecting a current battery temperature;

temperature rise value outputting means for obtaining the temperature rise value from the temperature detected by said temperature detecting means;

battery type detecting means for detecting a battery type;

allowable current value retrieving means for retrieving the map for the battery of the detected battery type of said storage device, from the battery type detected by said battery type detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

15. A battery charger capable of charging batteries of different types comprising;

a storage device storing a map, in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high, for every battery type;

temperature detecting means for detecting a current battery temperature;

temperature rise value outputting means for obtaining the temperature rise value from the temperature detected by said temperature detecting means;

battery type detecting means for detecting a battery type;

allowable current value retrieving means for retrieving the map for the battery of the detected battery type of said storage device, from the battery type detected by said battery type detecting means, the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means and the temperature rise value outputted from said temperature rise value outputting means belong to a region indicating a final charging period in the map for the battery of the detected battery type, is high; and charge completing means for completing the battery charge based on determination as the completion of the battery charge by said charge completion determining means.

16. A battery charger capable of charging batteries of different voltages comprising;

a storage device storing a map, in which an allowable current value, with which a battery can be charged while a temperature rise of the battery is being suppressed, is mapped based on a battery temperature value and a battery temperature rise value, for every battery voltage;

temperature detecting means for detecting a current battery temperature;

temperature rise value outputting means for obtaining the temperature rise value from the temperature detected by said temperature detecting means;

battery voltage detecting means for detecting a battery voltage;

allowable current value retrieving means for retrieving the map for the detected battery voltage, from the battery voltage detected by said battery voltage detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

17. A battery charger capable of charging batteries of different voltages comprising;

a storage device storing a map, in which an allowable current value, with which a battery can be charged while a temperature rise of the battery is being suppressed, is mapped based on a battery temperature value and a battery temperature rise value, for every battery voltage;

temperature detecting means for detecting a current battery temperature;

temperature rise value outputting means for obtaining the temperature rise value from the temperature detected by said temperature detecting means;

battery voltage detecting means for detecting a battery voltage;

allowable current value retrieving means for retrieving the map for the detected battery voltage, from the battery voltage detected by said battery voltage detecting means, the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means and the temperature rise value outputted from said temperature rise value outputting means belong to a region indicating a final charging period in the map for the battery voltage, is high; and charge completing means for completing the battery charge based on determination as the completion of the battery charge by said charge completion determining means.

18. A battery charger for charging a current, capable of outputting a residual battery capacity comprising;

a storage device storing a map, in which an allowable current value, with which a battery can be charged while a temperature rise of the battery is being suppressed, is mapped based on a battery temperature value and a battery temperature rise value, for every residual battery capacity;

temperature detecting means for detecting a current battery temperature;

temperature rise value outputting means for obtaining the temperature rise value from the temperature detected by said temperature detecting means;

battery capacity receiving means for receiving the residual battery capacity;

allowable current value retrieving means for retrieving the map for the received residual battery capacity of said storage device, from the battery residual capacity received by said battery capacity receiving means, the temperature detected by said temperature detecting means and the temperature rise value outputted from said temperature rise value outputting means, and for obtaining said allowable current value; and charging means for charging the battery with the allowable current value retrieved by said allowable current value retrieving means.

19. A battery charger for charging a battery, capable of outputting a residual battery capacity comprising;

a storage device storing a map, in which an allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high, for every residual battery capacity;

temperature detecting means for detecting a current battery temperature;

temperature rise value outputting means for obtaining the temperature rise value from the temperature detected by said temperature detecting means;

residual battery capacity receiving means for receiving the residual battery capacity;

allowable current value retrieving means for retrieving the map for the residual battery capacity detected battery voltage, from the residual battery capacity received by said battery capacity receiving means, the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means and the temperature rise value outputted from said temperature rise value outputting means belong to a region indicating a final charging period in the map for the residual battery capacity, is high; and charge completing means for completing the battery charge based on determination as the completion of the battery charge by said charge completion determining means.

20. A battery charger comprising;

a storage device storing at least two types of maps, in which an allowable current value, with which a battery can be charged while a temperature rise of the battery is being suppressed, is mapped based on a battery temperature value and a battery temperature rise value, in accordance with an environmental temperature;

temperature detecting means for detecting a current battery temperature;

temperature rise value outputting means for obtaining the temperature rise value from the temperature detected by said temperature detecting means;

environmental temperature detecting means for detecting the environmental temperature;

allowable current value retrieving means for retrieving a map for the environmental temperature, from the environmental temperature detected by said environmental temperature detecting means, the temperature detected by said temperature detecting means and the temperature rise value outputted from said temperature rise value outputting means, and for obtaining said allowable current value; and charging means for charging the battery with the allowable current value retrieved by said allowable current value retrieving means.

21. A battery charger comprising;

a storage device storing at least two types of maps, in which an allowable current value, with which a battery can be charged while a temperature rise of the battery is being suppressed, is mapped based on a battery temperature value and a battery temperature rise value and in which the allowable current value is set low if the temperature rise value is high and the allowable current value is set low if the temperature rise value is high, in accordance with an environmental temperature;

temperature detecting means for detecting a current battery temperature;

temperature rise value outputting means for obtaining the temperature rise value from the temperature detected by said temperature detecting means;

environmental temperature detecting means for detecting the environmental temperature;

allowable current value retrieving means for retrieving the map for the environmental temperature, from the environmental temperature detected by said environmental temperature detecting means, the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means and the temperature rise value outputted from said temperature rise value outputting means belong to a region indicating a final charging period in the map for the environmental temperature of said storage device, is high; and charge completing means for completing the battery charge based on determination as the completion of the battery charge by said charge completion determining means.

22. A battery charger comprising;

a storage device storing maps in which the allowable current value, with which a battery can be charged while a temperature rise of the battery is being suppressed, is mapped based on a battery temperature value and a battery temperature rise value, said maps including a first map for setting a relatively high allowable current value and a second map for setting a relatively low allowable current value;

temperature detecting means for detecting a current battery temperature;

temperature rise value outputting means for obtaining the temperature rise value from the temperature detected by said temperature detecting means;

map selecting means for selecting one of the first map and the second map of said storage device;

allowable current value retrieving means for retrieving the map selected by said map selecting means, from the temperature detected by said temperature detecting means and the temperature rise value outputted from said temperature rise value outputting means, and for obtaining said allowable current value; and charging means for charging the battery with the allowable current value retrieved by said allowable current value retrieving means.

23. A battery charger comprising;

a storage device storing maps in which the allowable current value, with which a battery can be charged while a temperature rise of the battery is being suppressed, is mapped based on a battery temperature value and a battery temperature rise value and in which the allowable current value is set low if the temperature value is high and the allowable current value is set low if the temperature rise value is high, said maps including a first map in which a target current capacity is relatively high and a second map in which the target current capacity is relatively low;

temperature detecting means for detecting a current battery temperature;

temperature rise value outputting means for obtaining the temperature rise value from the temperature detected by said temperature detecting means;

map selecting means for selecting one of the first map and the second map of said storage device;

allowable current value retrieving means for retrieving the map selected by said map selecting means, from the temperature detected by said temperature detecting means and the temperature rise value outputted from said temperature rise value outputting means, and for obtaining said allowable current value;

charging means for charging the battery with the allowable current value retrieved by said allowable current value retrieving means;

charge completion determining means for determining completion of battery charge based on whether frequency, with which the temperature detected by said temperature detecting means and the temperature rise value outputted from said temperature rise value outputting means belong to a region indicating a final charging period in the map selected by said map selecting means, is high; and charge completing means for completing the battery charge based on determination as the completion of the battery charge by said charge completion determining means.

24. A battery charger for conducting one of auxiliary charge and trickle charge after completing battery charge, characterized by comprising:

a storage device storing a map in which an allowable current value, with which a battery can be charged in a pulse-like manner while a battery temperature is being suppressed, and a pulse interval are mapped based on a battery temperature and a battery temperature decrease value;

temperature detecting means for detecting a current battery temperature;

temperature decrease value outputting means for obtaining the temperature decrease value from the temperature detected by said temperature detecting means;

allowable current value retrieving means for retrieving the map of said storage device from the temperature detected by said temperature detecting means and the temperature decrease value outputted from said temperature decrease value outputting means, and for obtaining said allowable current value and said pulse interval; and charging means for charging the battery with the allowable current value the pulse interval detected by said allowable current value retrieving means.

25. The battery charger according to claim 24, wherein the map of said storage device is set such that if the battery temperature is high and the temperature decrease is small, the allowable current value is high and the pulse interval is long and that if the battery temperature is low and the temperature decrease is large, the allowable current value is low and the pulse interval is short.

* * * * *